(12) United States Patent
Harrison et al.

(10) Patent No.: US 11,455,603 B2
(45) Date of Patent: Sep. 27, 2022

(54) PAYMENT VIA FINANCIAL SERVICE PROVIDER USING NETWORK-BASED DEVICE

(71) Applicant: PayPal, Inc., San Jose, CA (US)

(72) Inventors: Mark Harrison, San Francisco, CA (US); Hugo Olliphant, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 1102 days.

(21) Appl. No.: 15/457,703

(22) Filed: Mar. 13, 2017

(65) Prior Publication Data
US 2017/0185975 A1  Jun. 29, 2017

Related U.S. Application Data

(63) Continuation of application No. 11/095,411, filed on Mar. 31, 2005, now abandoned.

(51) Int. Cl.
| | |
|---|---|
| *G06Q 20/08* | (2012.01) |
| *G06Q 20/12* | (2012.01) |
| *G06Q 20/02* | (2012.01) |
| *G06Q 30/02* | (2012.01) |
| *H04L 67/02* | (2022.01) |

(Continued)

(52) U.S. Cl.
CPC ......... *G06Q 20/0855* (2013.01); *G06Q 20/02* (2013.01); *G06Q 20/12* (2013.01); *G06Q 20/24* (2013.01); *G06Q 20/325* (2013.01); *G06Q 20/40* (2013.01); *G06Q 30/02* (2013.01); *G06Q 30/0256* (2013.01); *G06Q 30/04* (2013.01);

(Continued)

(58) Field of Classification Search
None
See application file for complete search history.

(56) References Cited

U.S. PATENT DOCUMENTS

| | | |
|---|---|---|
| 4,799,156 A | 1/1989 | Shavit et al. |
| 5,684,861 A | 11/1997 | Lewis et al. |

(Continued)

FOREIGN PATENT DOCUMENTS

| | | |
|---|---|---|
| AU | 2006230277 | 2/2010 |
| AU | 2010201969 | 3/2012 |

(Continued)

OTHER PUBLICATIONS

3D Secure Mobile Authenication Scenarios,1Version 1.0), Visa, (Jun. 30, 2002).

(Continued)

*Primary Examiner* — Neha Patel
*Assistant Examiner* — Nicholas K Phan

(57) ABSTRACT

A system includes an interface to receive a request associated with a third party at a financial service provider from a network-based device associated with a user. The request includes an identifier that identifies an offer. The system further includes a revenue share application configured to determine whether the transaction involves a plurality of third parties and to determine a payment share for each party of the plurality of third parties based on the transaction involving the plurality of third parties. A payment transfer module transfers the payment share from an account of the user to each account associated with each party of the plurality of third parties.

20 Claims, 9 Drawing Sheets

(51) Int. Cl.
*H04L 67/04* (2022.01)
*H04L 67/53* (2022.01)
*G06Q 20/32* (2012.01)
*G06Q 30/04* (2012.01)
*G06Q 20/24* (2012.01)
*G06Q 20/40* (2012.01)

(52) U.S. Cl.
CPC .............. *H04L 67/02* (2013.01); *H04L 67/04* (2013.01); *H04L 67/53* (2022.05)

(56) References Cited

U.S. PATENT DOCUMENTS

| | | | |
|---|---|---|---|
| 5,713,072 A | 1/1998 | Marth et al. | |
| 5,715,314 A * | 2/1998 | Payne | G06Q 10/087 705/26.35 |
| 5,778,178 A | 7/1998 | Arunachalum | |
| 5,864,830 A | 1/1999 | Armetta et al. | |
| 5,884,280 A | 3/1999 | Yoshioka et al. | |
| 5,892,900 A | 4/1999 | Ginter et al. | |
| 5,903,721 A | 5/1999 | Sixtus | |
| 5,903,881 A | 5/1999 | Schrader et al. | |
| 5,905,736 A | 5/1999 | Ronen et al. | |
| 5,953,710 A | 9/1999 | Fleming | |
| 5,960,411 A | 9/1999 | Hartman et al. | |
| 5,983,094 A | 11/1999 | Altschul et al. | |
| 5,987,500 A | 11/1999 | Arunachalam | |
| 6,002,771 A * | 12/1999 | Nielsen | G06Q 20/04 380/30 |
| 6,029,147 A | 2/2000 | Horadan et al. | |
| 6,044,360 A | 3/2000 | Piccialllo | |
| 6,144,847 A | 11/2000 | Altschul et al. | |
| 6,175,741 B1 | 1/2001 | Alperovich | |
| 6,212,556 B1 | 4/2001 | Arunachalam | |
| 6,219,650 B1 | 4/2001 | Friend et al. | |
| 6,235,176 B1 | 5/2001 | Schoen et al. | |
| 6,260,024 B1 | 7/2001 | Shkedy | |
| 6,311,170 B1 | 10/2001 | Embrey et al. | |
| 6,324,523 B1 | 11/2001 | Killeen, Jr. et al. | |
| 6,327,573 B1 | 12/2001 | Walker et al. | |
| 6,327,578 B1 * | 12/2001 | Linehan | G06Q 20/02 705/65 |
| 6,338,047 B1 | 1/2002 | Wallman | |
| 6,349,205 B1 | 2/2002 | Fang et al. | |
| 6,424,706 B1 | 7/2002 | Katz et al. | |
| 6,564,047 B1 | 5/2003 | Steele et al. | |
| 6,578,014 B1 | 6/2003 | Murcko, Jr. | |
| 6,604,086 B1 | 8/2003 | Kolls | |
| 6,615,183 B1 | 9/2003 | Kolls | |
| 6,622,128 B1 | 9/2003 | Bedell et al. | |
| 6,629,080 B1 | 9/2003 | Kolls | |
| 6,699,188 B2 | 3/2004 | Wessel | |
| 6,736,314 B2 | 5/2004 | Cooper et al. | |
| 6,839,689 B2 | 1/2005 | Aieta et al. | |
| 6,845,361 B1 | 1/2005 | Dowling | |
| 6,865,545 B1 * | 3/2005 | Epstein | B41J 11/0005 705/14.26 |
| 6,882,979 B1 | 4/2005 | Reay et al. | |
| 6,886,741 B1 | 5/2005 | Salveson | |
| 6,915,138 B2 | 7/2005 | Kraft | |
| 6,937,731 B2 | 8/2005 | Chiu | |
| 6,983,261 B1 | 1/2006 | Francisco et al. | |
| 7,072,854 B2 * | 7/2006 | Loeser | G06Q 20/04 705/16 |
| 7,092,913 B2 | 8/2006 | Cannon, Jr. | |
| 7,103,576 B2 | 9/2006 | Mann, III et al. | |
| 7,126,481 B2 * | 10/2006 | Vesikivi | G06Q 30/02 340/572.4 |
| 7,158,753 B2 | 1/2007 | Kagan et al. | |
| 7,194,427 B1 | 3/2007 | Van Horn et al. | |
| 7,295,992 B2 | 11/2007 | Villaret et al. | |
| 7,343,335 B1 | 3/2008 | Olliphant | |
| 7,356,507 B2 | 4/2008 | Bezos et al. | |
| 7,398,252 B2 | 7/2008 | Neofytides et al. | |
| 7,430,516 B1 | 9/2008 | Blair et al. | |
| 7,457,608 B2 | 11/2008 | Shah | |
| 7,546,254 B2 | 6/2009 | Bednarek | |
| 7,580,856 B1 | 8/2009 | Pliha | |
| 7,685,020 B2 | 3/2010 | Do et al. | |
| 7,734,545 B1 | 6/2010 | Fogliano et al. | |
| 7,822,688 B2 * | 10/2010 | Labrou | G06Q 20/02 705/67 |
| 7,831,520 B2 | 11/2010 | Mengerink | |
| 7,909,237 B2 | 3/2011 | Tredeau et al. | |
| 7,925,591 B2 | 4/2011 | Gajjala et al. | |
| 8,364,566 B2 | 1/2013 | Hugo | |
| 8,484,127 B2 | 7/2013 | Hugo | |
| 8,751,387 B2 | 6/2014 | Hougland et al. | |
| 2001/0029492 A1 * | 10/2001 | Uchikata | G06Q 30/06 705/64 |
| 2002/0002513 A1 | 1/2002 | Chiasson | |
| 2002/0002530 A1 | 1/2002 | May | |
| 2002/0004733 A1 | 1/2002 | Addante | |
| 2002/0016765 A1 | 2/2002 | Sacks | |
| 2002/0029339 A1 | 3/2002 | Rowe | |
| 2002/0046040 A1 | 4/2002 | Kirner | |
| 2002/0052754 A1 | 5/2002 | Joyce et al. | |
| 2002/0052841 A1 | 5/2002 | Guthrie et al. | |
| 2002/0062257 A1 | 5/2002 | Minamishin et al. | |
| 2002/0077890 A1 | 6/2002 | Lapointe et al. | |
| 2002/0082986 A1 | 6/2002 | Lu et al. | |
| 2002/0095372 A1 | 7/2002 | Likourezos et al. | |
| 2002/0095376 A1 | 7/2002 | Likourezos et al. | |
| 2002/0095377 A1 | 7/2002 | Likourezos et al. | |
| 2002/0095379 A1 | 7/2002 | Likourezos et al. | |
| 2002/0111907 A1 | 8/2002 | Ling | |
| 2002/0111908 A1 | 8/2002 | Milberger et al. | |
| 2002/0116329 A1 | 8/2002 | Serbetcioglu et al. | |
| 2002/0119767 A1 | 8/2002 | Fieldhouse et al. | |
| 2002/0120582 A1 | 8/2002 | Elston et al. | |
| 2002/0128932 A1 | 9/2002 | Yung et al. | |
| 2002/0143638 A1 | 10/2002 | August et al. | |
| 2002/0143655 A1 | 10/2002 | Elston et al. | |
| 2002/0152123 A1 | 10/2002 | Giordano et al. | |
| 2002/0152176 A1 | 10/2002 | Neofytides et al. | |
| 2002/0152179 A1 | 10/2002 | Racov | |
| 2002/0169662 A1 | 11/2002 | Claiborne | |
| 2002/0188527 A1 | 12/2002 | Dillard et al. | |
| 2002/0198847 A1 | 12/2002 | Fahraeus | |
| 2003/0013516 A1 * | 1/2003 | Walker | G07F 17/32 463/25 |
| 2003/0014327 A1 | 1/2003 | Skantze | |
| 2003/0026404 A1 | 2/2003 | Joyce et al. | |
| 2003/0032409 A1 | 2/2003 | Hutcheson et al. | |
| 2003/0046091 A1 | 3/2003 | Arneson et al. | |
| 2003/0073426 A1 | 4/2003 | Chan et al. | |
| 2003/0096596 A1 | 5/2003 | Sini et al. | |
| 2003/0120505 A1 | 6/2003 | Spiegel | |
| 2003/0120734 A1 | 6/2003 | Kagan et al. | |
| 2003/0135470 A1 | 7/2003 | Beard | |
| 2003/0143978 A1 | 7/2003 | Cooper et al. | |
| 2003/0152039 A1 | 8/2003 | Roberts | |
| 2003/0154139 A1 | 8/2003 | Woo | |
| 2003/0154164 A1 | 8/2003 | Mascavage et al. | |
| 2003/0163418 A1 | 8/2003 | Marks et al. | |
| 2003/0216996 A1 | 11/2003 | Cummings et al. | |
| 2003/0220835 A1 | 11/2003 | Barnes, Jr. | |
| 2004/0019564 A1 | 1/2004 | Goldthwaite et al. | |
| 2004/0030601 A1 | 2/2004 | Pond et al. | |
| 2004/0058694 A1 | 3/2004 | Mendiola et al. | |
| 2004/0093266 A1 * | 5/2004 | Dohring | G06Q 30/0222 705/14.23 |
| 2004/0103029 A1 * | 5/2004 | McClintock | G06Q 30/0251 705/14.49 |
| 2004/0103060 A1 | 5/2004 | Foth et al. | |
| 2004/0122767 A1 | 6/2004 | Sanchez | |
| 2004/0133511 A1 | 7/2004 | Smith et al. | |
| 2004/0133622 A1 | 7/2004 | Clubb et al. | |
| 2004/0139015 A1 | 7/2004 | Luttge | |
| 2004/0148254 A1 | 7/2004 | Hauser | |
| 2004/0151293 A1 | 8/2004 | Jensen et al. | |
| 2004/0186770 A1 | 9/2004 | Pettit et al. | |
| 2004/0210517 A1 | 10/2004 | Brooks et al. | |

(56) References Cited

U.S. PATENT DOCUMENTS

| | | |
|---|---|---|
| 2004/0225606 A1 | 11/2004 | Nguyen et al. |
| 2004/0230536 A1 | 11/2004 | Fung et al. |
| 2004/0235500 A1 | 11/2004 | Dombkowski et al. |
| 2005/0033684 A1 | 2/2005 | Benedyk et al. |
| 2005/0096977 A1 | 5/2005 | Rossides |
| 2005/0125315 A1 | 6/2005 | Munoz et al. |
| 2005/0192893 A1 | 9/2005 | Keeling et al. |
| 2005/0250537 A1 | 11/2005 | Narea |
| 2005/0251440 A1 | 11/2005 | Bednarek |
| 2005/0256802 A1 | 11/2005 | Ammermann et al. |
| 2005/0267816 A1 | 12/2005 | Jaramillo |
| 2005/0287982 A1 | 12/2005 | Brewer et al. |
| 2006/0116105 A1 | 1/2006 | Frankel et al. |
| 2006/0036541 A1 | 2/2006 | Schleicher |
| 2006/0073808 A1 | 4/2006 | Buchert |
| 2006/0167791 A1 | 7/2006 | Hahn-Carlson |
| 2006/0173778 A1 | 8/2006 | Lipsky et al. |
| 2006/0218651 A1 | 9/2006 | Ginter |
| 2006/0224508 A1 | 10/2006 | Fietz |
| 2006/0229998 A1 | 10/2006 | Harrison et al. |
| 2006/0270478 A1 | 11/2006 | Barhydt et al. |
| 2006/0294025 A1 | 12/2006 | Mengerink |
| 2007/0005432 A1 | 1/2007 | Likourezos et al. |
| 2007/0011104 A1 | 1/2007 | Leger et al. |
| 2007/0118476 A1 | 5/2007 | Likourezos et al. |
| 2007/0156580 A1 | 7/2007 | Imrey et al. |
| 2007/0232232 A1 | 10/2007 | Matsuo |
| 2008/0059366 A1 | 3/2008 | Fou |
| 2008/0140564 A1 | 6/2008 | Tal et al. |
| 2008/0140577 A1 | 6/2008 | Rahman et al. |
| 2008/0162340 A1 | 7/2008 | Zimmer et al. |
| 2008/0195510 A1 | 8/2008 | Olliphant |
| 2008/0249931 A1 | 10/2008 | Gilder et al. |
| 2009/0106152 A1 | 4/2009 | Dill et al. |
| 2009/0119207 A1 | 5/2009 | Grecia |
| 2009/0144193 A1 | 6/2009 | Giordano et al. |
| 2009/0248584 A1 | 10/2009 | Eduardo et al. |
| 2009/0265252 A1 | 10/2009 | Fletcher |
| 2009/0327128 A1 | 12/2009 | Olliphant |
| 2010/0010906 A1 | 1/2010 | Grecia et al. |
| 2010/0042538 A1 | 2/2010 | Dheer et al. |
| 2010/0063924 A1 | 3/2010 | Hougland et al. |
| 2010/0063926 A1 | 3/2010 | Hougland et al. |
| 2010/0191629 A1 | 7/2010 | Olliphant |
| 2010/0191645 A1 | 7/2010 | Hougland et al. |
| 2010/0250687 A1 | 9/2010 | Smith et al. |
| 2011/0055038 A1 | 3/2011 | Mengerink |
| 2012/0246080 A1 | 9/2012 | Bajan et al. |
| 2012/0271707 A1 | 10/2012 | Harrison et al. |
| 2014/0058939 A1 | 2/2014 | Savla |
| 2017/0185975 A1 | 6/2017 | Harrison et al. |

FOREIGN PATENT DOCUMENTS

| | | |
|---|---|---|
| AU | 2012203359 | 8/2013 |
| AU | 2009291867 B2 | 5/2014 |
| AU | 2013245643 | 10/2015 |
| AU | 2016200558 | 3/2018 |
| CA | 2306521 A1 | 10/2001 |
| CN | 102209972 A | 10/2011 |
| EP | 1081617 A2 | 3/2001 |
| JP | 9073487 A | 3/1997 |
| JP | 1145298 A | 2/1999 |
| JP | 2000250979 A | 9/2000 |
| JP | 2002352086 A | 12/2002 |
| JP | 200446377 A | 2/2004 |
| KR | 1020000063805 | 11/2000 |
| KR | 1020010106707 A | 12/2001 |
| KR | 1020020081631 A | 10/2002 |
| KR | 1020030073697 A | 9/2003 |
| KR | 1020040010510 | 1/2004 |
| KR | 100513158 B1 | 9/2005 |
| KR | 1020070052103 A | 5/2007 |
| WO | 9631848 A2 | 10/1996 |
| WO | 2002071354 A2 | 9/2002 |
| WO | 04099939 A2 | 11/2004 |
| WO | 2006105202 | 10/2006 |
| WO | 2006105202 A2 | 10/2006 |
| WO | 2006105202 A3 | 10/2006 |
| WO | 2006105202 B1 | 10/2006 |
| WO | 2008/033551 A3 | 3/2008 |
| WO | 2008033551 A2 | 3/2008 |
| WO | 2010030672 A1 | 3/2010 |
| WO | 2014031866 A2 | 2/2014 |
| WO | 2014031866 A3 | 2/2014 |

OTHER PUBLICATIONS

3G: All About Technology Retrieved via Wayback Machine on 1, International Telecommunication Union. Dec. 5, 2003, [URL:http://www.itu.inUosg/spu/ni/3g/technology/index.html], (Dec. 2009).

U.S. Appl. No. 09/633,962, Appeal Brief filed Oct. 11, 2005, 31 pgs.

U.S. Appl. No. 09/633,962, Final Office Action dated Feb. 7, 2005, 13 pgs.

U.S. Appl. No. 09/633,962, Final Office Action dated Nov. 28, 2003, 10 pgs.

U.S. Appl. No. 09/633,962, Non Final Office Action dated Feb. 16, 2006, 11 pgs.

U.S. Appl. No. 09/633,962, Non Final Office Action dated Jun. 5, 2003, 8 pgs.

U.S. Appl. No. 09/633,962, Non Final Office Action dated Sep. 14, 2004, 13 pgs.

U.S. Appl. No. 09/633,962, Notice of Allowance dated Oct. 17, 2007, 8 pgs.

U.S. Appl. No. 09/633,962, Response filed Apr. 17, 2006 to Non Final Office Action dated Feb. 16, 2006, 2 pgs.

U.S. Appl. No. 09/633,962, Response filed May 28, 2004 to Final Office Action dated Nov. 28, 2003, 11 pgs.

U.S. Appl. No. 09/633,962, Response filed Aug. 28, 2003 to Non Final Office Action dated Jun. 5, 2003, 6 pgs.

U.S. Appl. No. 09/633,962, Response filed Oct. 28, 2004 to Non Final Office Action dated Sep. 14, 2004, 16 pgs.

U.S. Appl. No. 09/633,962, Supplemental Appeal Brief filed May 5, 2006, 28 pgs.

U.S. Appl. No. 11/095,411 , Response filed Aug. 25, 2011 to Final Office Action dated Jul. 13, 2011, 21 pgs.

U.S. Appl. No. 11/095,411, Advisory Action dated Sep. 8, 2011, 3 pgs.

U.S. Appl. No. 11/095,411, Advisory Action dated Nov. 19, 2009, 4 pgs.

U.S. Appl. No. 11/095,411, Appeal Brief filed Dec. 12, 2011, 34 pgs.

U.S. Appl. No. 11/095,411, Appeal Decision mailed Jun. 12, 2015, 11 pgs.

U.S. Appl. No. 11/095,411, Examiner's Answer dated Jan. 30, 2012, 30 pgs.

U.S. Appl. No. 11/095,411, Final Office Action dated Jun. 18, 2010, 16 pgs.

U.S. Appl. No. 11/095,411, Final Office Action dated Jul. 13, 2011, 24 pgs.

U.S. Appl. No. 11/095,411, Final Office Action dated Aug. 28, 2009, 17 pgs.

U.S. Appl. No. 11/095,411, Non Final Office Action dated Mar. 7, 2011, 20 pgs.

U.S. Appl. No. 11/095,411, Non Final Office Action dated Jun. 13, 2016, 24 pgs.

U.S. Appl. No. 11/095,411, Non-Final Office Action dated Feb. 27, 2009, 13 pgs.

U.S. Appl. No. 11/095,411, Non-Final Office Action dated Dec. 28, 2009, 15 pgs.

U.S. Appl. No. 11/095,411, Pre-Appeal Brief Request Oct. 10, 2011, 5 pgs.

U.S. Appl. No. 11/095,411, Preliminary Amendment filed Feb. 23, 2007, 11 pgs.

U.S. Appl. No. 11/095,411, Preliminary Amendment filed Aug. 25, 2005, 8 pgs.

U.S. Appl. No. 11/095,411, Response filed Mar. 29, 2010 to Non Final Office Action dated Dec. 28, 2009, 13 pgs.

(56) References Cited

OTHER PUBLICATIONS

U.S. Appl. No. 11/095,411, Response filed May 27, 2009 to Non Final Office Action dated Feb. 27, 2009, 14 pgs.
U.S. Appl. No. 11/095,411, Response filed Jun. 2, 2011 to Non-Final Office Action dated Mar. 7, 2011, 20 pgs.
U.S. Appl. No. 11/095,411, Response filed Oct. 18, 2010 to Final Office Action dated Jun. 18, 2010, 14 pgs.
U.S. Appl. No. 11/095,411, Response filed Oct. 28, 2009 to Final Office Action dated Aug. 28, 2009, 13 pgs.
U.S. Appl. No. 11/168,277, Advisory Action dated Mar. 9, 2010, 2 pgs.
U.S. Appl. No. 11/168,277, Advisory Action dated Mar. 11, 2009, 3 pgs.
U.S. Appl. No. 11/168,277, Examiner Interview Summary dated May 27, 2009, 1 pg.
U.S. Appl. No. 11/168,277, Final Office Action dated Dec. 11, 2009, 18 pgs.
U.S. Appl. No. 11/168,277, Final Office Action dated Dec. 26, 2008, 24 pgs.
U.S. Appl. No. 11/168,277, Non Final Office Action dated Apr. 30, 2009, 28 pgs.
U.S. Appl. No. 11/168,277, Non Final Office Action dated May 27, 2009, 24 pgs.
U.S. Appl. No. 11/168,277, Non-Final Office Action dated Aug. 25, 2008, 33 pgs.
U.S. Appl. No. 11/168,277, Notice of Allowance dated Jul. 21, 2010, 19 pgs.
U.S. Appl. No. 11/168,277, Preliminary Amendment dated Apr. 17, 2009, 10 pgs.
U.S. Appl. No. 11/168,277, Response filed Feb. 12, 2010 to Final Office Action dated Dec. 11, 2009, 14 pgs.
U.S. Appl. No. 11/168,277, Response filed Feb. 26, 2009 to Final Office Action dated Dec. 26, 2008, 14 pgs.
U.S. Appl. No. 11/168,277, Response filed Jun. 19, 2009 to Restriction Requirement dated Mar. 19, 2009, 5 pgs.
U.S. Appl. No. 11/168,277, Response filed Aug. 24, 2009 to Non Final Office Action dated May 27, 2009, 20 pgs.
U.S. Appl. No. 11/168,277, Response filed Nov. 4, 2008 to Non-Final Office Action dated Aug. 25, 2008, 20 pgs.
U.S. Appl. No. 11/168,277, Restriction Requirement dated Mar. 19, 2009, 6 pgs.
U.S. Appl. No. 11/521,997, Examiner Interview Summary dated Jan. 26, 2015, 3 pgs.
U.S. Appl. No. 11/521,997, Examiner Interview Summary dated Feb. 20, 2015, 3 pgs.
U.S. Appl. No. 11/521,997, Examiner Interview Summary dated Aug. 31, 2015, 3 pgs.
U.S. Appl. No. 11/521,997, Final Office Action dated Jun. 1, 2015, 11 pgs.
U.S. Appl. No. 11/521,997, Non-Final Office Action dated Aug. 11, 2009, 18 pgs.
U.S. Appl. No. 11/521,997, Response filed Feb. 11, 2010 to Non Final Office Action dated Aug. 11, 2009, 8 pgs.
U.S. Appl. No. 11/521,997, Response filed Jun. 19, 2009 to Restriction Requirement dated Mar. 19, 2009, 5 pgs.
U.S. Appl. No. 11/521,997, Response filed Sep. 1, 2015 to Final Office Action dated Jun. 1, 2015, 17 pgs.
U.S. Appl. No. 11/521,997, Restriction Requirement dated Mar. 19, 2009, 6 pgs.
U.S. Appl. No. 12/025,223, Advisory Action dated Mar. 1, 2012, 3 pgs.
U.S. Appl. No. 12/025,223, Decision on Pre-Appeal Brief mailed Apr. 17, 2012, 2 pgs.
U.S. Appl. No. 12/025,223, Final Office Action dated Dec. 6, 2011, 10 pgs.
U.S. Appl. No. 12/025,223, Non Final Office Action dated Jun. 24, 2011, 12 pgs.
U.S. Appl. No. 12/025,223, Notice of Allowance dated Jun. 22, 2012, 10 pgs.
U.S. Appl. No. 12/025,223, Notice of Allowance dated Sep. 18, 2012, 10 pgs.
U.S. Appl. No. 12/025,223, Pre-Appeal Brief filed Mar. 6, 2012, 7 pgs.
U.S. Appl. No. 12/025,223, Response filed Feb. 6, 2012 to Final Office Action dated Dec. 6, 2011, 21 pgs.
U.S. Appl. No. 12/025,223, Response filed Aug. 25, 2011 to Non Final Office Action dated Jun. 24, 2011, 19 pgs.
U.S. Appl. No. 12/207,383, Advisory Action dated Jun. 23, 2015, 3 pgs.
U.S. Appl. No. 12/207,383, Appeal Brief filed Aug. 17, 2015, 35 pgs.
U.S. Appl. No. 12/207,383, Examiner's Answer dated Nov. 4, 2015, 8 pgs.
U.S. Appl. No. 12/207,383, Final Office Action dated Apr. 6, 2015, 8 pgs.
U.S. Appl. No. 12/207,383, Final Office Action dated Jun. 9, 2011, 17 pgs.
U.S. Appl. No. 12/207,383, Final Office Action dated Dec. 24, 2009, 21 pgs.
U.S. Appl. No. 12/207,383, Non Final Office Action dated May 13, 2014, 15 pgs.
U.S. Appl. No. 12/207,383, Non Final Office Action dated Oct. 28, 2014, 8 pgs.
U.S. Appl. No. 12/207,383, Non Final Office Action dated Nov. 15, 2013, 16 pgs.
U.S. Appl. No. 12/207,383, Non Final Office Action dated Dec. 22, 2010, 16 pgs.
U.S. Appl. No. 12/207,383, Non-Final Office Action dated Jun. 25, 2009, 16 pgs.
U.S. Appl. No. 12/207,383, Reply Brief filed Jan. 4, 2016, 9 pgs.
U.S. Appl. No. 12/207,383, Response filed Jan. 27, 2015 to Non-Final Office Action dated Oct. 28, 2014, 20 pgs.
U.S. Appl. No. 12/207,383, Response filed Mar. 17, 2014 to Non Final Office Action dated Nov. 15, 2013, 10 pgs.
U.S. Appl. No. 12/207,383, Response filed Mar. 22, 2011 to Non-Final Office Action dated Dec. 22, 2010, 14 pgs.
U.S. Appl. No. 12/207,383, Response filed Mar. 24, 2010 to Final Office Action dated Dec. 24, 2009, 12 pgs.
U.S. Appl. No. 12/207,383, Response filed Jun. 8, 2015 to Final Office Action dated Apr. 6, 2015, 31 pgs.
U.S. Appl. No. 12/207,383, Response filed Aug. 2, 2011 to Final Office Action dated Jun. 9, 2011, 12 pgs.
U.S. Appl. No. 12/207,383, Response filed Sep. 12, 2014 to Non Final Office Action dated May 13, 2014, 12 pgs.
U.S. Appl. No. 12/207,383, Response filed Sep. 25, 2009 to Non Final Office Action dated Jun. 25, 2009, 13 pgs.
U.S. Appl. No. 12/554,785 , Response filed Jan. 17, 2012 to Non Final Office Action dated Sep. 16, 2011, 9 pgs.
U.S. Appl. No. 12/554,785, Non Final Office Action dated Mar. 30, 2012, 9 pgs.
U.S. Appl. No. 12/554,785, Non Final Office Action dated Sep. 16, 2011, 10 pgs.
U.S. Appl. No. 12/554,785, Notice of Allowance dated May 24, 2013, 8 pgs.
U.S. Appl. No. 12/554,785, Notice of Allowance dated Sep. 18, 2012, 7 pgs.
U.S. Appl. No. 12/554,785, Response filed Jul. 2, 2012 to Non Final Office Action dated Mar. 30, 2012, 9 pgs.
U.S. Appl. No. 12/572,125 , Response filed Mar. 13, 2013 to Final Office Action dated Nov. 13, 2012, 11 pgs.
U.S. Appl. No. 12/572,125, Final Office Action dated May 19, 2011, 14 pgs.
U.S. Appl. No. 12/572,125, Final Office Action dated Nov. 13, 2012, 11 pgs.
U.S. Appl. No. 12/572,125, Non Final Office Action dated Jul. 19, 2012, 11 pgs.
U.S. Appl. No. 12/572,125, Non Final Office Action dated Dec. 9, 2010, 11 pgs.
U.S. Appl. No. 12/572,125, Notice of Allowance dated Nov. 22, 2013, 13 pgs.
U.S. Appl. No. 12/572,125, Response filed Mar. 9, 2011 to Non-Final Office Action dated Dec. 9, 2010, 11 pgs.

(56) References Cited

OTHER PUBLICATIONS

U.S. Appl. No. 12/572,125, Response filed Jul. 27, 2011 to Final Office Action dated May 19, 2011, 13 pgs.
U.S. Appl. No. 12/572,125, Response filed Oct. 11, 2012 to Non Final Office Action dated Jul. 19, 2012, 11 pgs.
U.S. Appl. No. 12/752,976, Appeal Brief filed Mar. 25, 2014, 16 pgs.
U.S. Appl. No. 12/752,976, Appeal Brief filed Nov. 24, 2015, 26 pgs.
U.S. Appl. No. 12/752,976, Decision on Pre-Appeal Brief Request mailed Feb. 25, 2014, 2 pgs.
U.S. Appl. No. 12/752,976, Examiner's Answer dated Mar. 21, 2016, 6 pgs.
U.S. Appl. No. 12/752,976, Final Office Action dated Jan. 9, 2015, 7 pgs.
U.S. Appl. No. 12/752,976, Final Office Action dated May 22, 2015, 7 pgs.
U.S. Appl. No. 12/752,976, Final Office Action dated Jul. 5, 2012, 9 pgs.
U.S. Appl. No. 12/752,976, Final Office Action dated Sep. 17, 2013, 9 pgs.
U.S. Appl. No. 12/752,976, Non Final Office Action dated Jan. 27, 2012, 10 pgs.
U.S. Appl. No. 12/752,976, Non Final Office Action dated Mar. 1, 2013, 9 pgs.
U.S. Appl. No. 12/752,976, Non Final Office Action dated Jul. 14, 2014, 8 pgs.
U.S. Appl. No. 12/752,976, Pre-Appeal Brief Request filed Jan. 17, 2014, 5 pgs.
U.S. Appl. No. 12/752,976, Reply Brief filed May 23, 2016, 9 pgs.
U.S. Appl. No. 12/752,976, Response filed Apr. 27, 2012 to Non Final Office Action dated Jan. 27, 2012, 9 pgs.
U.S. Appl. No. 12/752,976, Response filed May 11, 2015 to Final Office Action dated Jan. 9, 2015, 22 pgs.
U.S. Appl. No. 12/752,976, Response filed Jun. 3, 2013 to Non Final Office Action dated Mar. 1, 2013, 9 pgs.
U.S. Appl. No. 12/752,976, Response filed Oct. 5, 2012 to Final Office Action dated Jul. 15, 2012, 8 pgs.
U.S. Appl. No. 12/752,976, Response filed Nov. 14, 2014 to Non Final Office Action dated Jul. 14, 2014, 13 pgs.
U.S. Appl. No. 12/752,985, Advisory Action dated Jun. 4, 2015, 3 pgs.
U.S. Appl. No. 12/752,985, Appeal Brief filed Aug. 14, 2015, 29 pgs.
U.S. Appl. No. 12/752,985, Examiner's Answer dated Nov. 4, 2015, 8 pg.
U.S. Appl. No. 12/752,985, Final Office Action dated Mar. 9, 2012, 11 pgs.
U.S. Appl. No. 12/752,985, Final Office Action dated Mar. 20, 2015, 7 pgs.
U.S. Appl. No. 12/752,985, Final Office Action dated Nov. 14, 2012, 12 pgs.
U.S. Appl. No. 12/752,985, Non Final Office Action dated May 15, 2014, 14 pgs.
U.S. Appl. No. 12/752,985, Non Final Office Action dated Jul. 23, 2012, 11 pgs.
U.S. Appl. No. 12/752,985, Non Final Office Action dated Sep. 23, 2011, 12 pgs.
U.S. Appl. No. 12/752,985, Non Final Office Action dated Oct. 10, 2014, 7 pgs.
U.S. Appl. No. 12/752,985, Non Final Office Action dated Nov. 20, 2013, 15 pgs.
U.S. Appl. No. 12/752,985, Reply Brief filed Jan. 4, 2016, 10 pgs.
U.S. Appl. No. 12/752,985, Response filed Jan. 12, 2015 to Non Final Office Action dated Oct. 10, 2014, 19 pgs.
U.S. Appl. No. 12/752,985, Response filed Mar. 14, 2013 to Final Office Action dated Nov. 14, 2012, 11 pgs.
U.S. Appl. No. 12/752,985, Response filed Mar. 20, 2014 to Non Final Office Action dated Nov. 20, 2013, 9 pgs.
U.S. Appl. No. 12/752,985, Response filed Aug. 15, 2014 to Non Final Office Action dated May 15, 2014, 10 pgs.
U.S. Appl. No. 12/752,985, Response filed Oct. 12, 2012 to Non Final Office Action dated Jul. 23, 2012, 12 pgs.
U.S. Appl. No. 12/752,985, Response filed Dec. 21, 2011 to Non Final Office Action dated Sep. 23, 2011, 10 pgs.
U.S. Appl. No. 12/752,985, Response filed May 20, 2015 to Final Office Action dated Mar. 20, 2015, 30 pgs.
U.S. Appl. No. 12/752,985. Response filed Jun. 11, 2012 to Final Office Action dated Mar. 9, 2012, 9 pgs.
U.S. Appl. No. 12/941,944, Appeal Brief filed Apr. 14, 2014, 20 pgs.
U.S. Appl. No. 12/941,944, Appeal Brief Request filed Feb. 12, 2014, 5 pgs.
U.S. Appl. No. 12/941,944, Decision on Pre-Appeal Brief Request mailed Mar. 11, 2014, 2 pgs.
U.S. Appl. No. 12/941,944, Examiner's Answer dated May 28, 2014, 12 pgs.
U.S. Appl. No. 12/941,944, Final Office Action dated Nov. 9, 2011, 13 pgs.
U.S. Appl. No. 12/941,944, Final Office Action dated Nov. 12, 2013, 19 pgs.
U.S. Appl. No. 12/941,944, Non Final Office Action dated May 25, 2011, 17 pgs.
U.S. Appl. No. 12/941,944, Non Final Office Action dated Jul. 30, 2013, 16 pgs.
U.S. Appl. No. 12/941,944, Reply Brief filed Jul. 28, 2014, 4 pgs.
U.S. Appl. No. 12/941,944, Response filed Feb. 9, 2012 to Final Office Action dated Nov. 9, 2011, 9 pgs.
U.S. Appl. No. 12/941,944, Response filed Aug. 24, 2011 to Non Final Office Action dated May 25, 2011, 11 pgs.
U.S. Appl. No. 12/941,944, Response filed Oct. 30, 2013 to Non Final Office Action dated Jul. 30, 2013, 11 pgs.
U.S. Appl. No. 13/535,189, Final Office Action dated Jan. 4, 2013, 15 pgs.
U.S. Appl. No. 13/535,189, Final Office Action dated Jun. 6, 2014, 10 pgs.
U.S. Appl. No. 13/535,189, Non Final Office Action dated Aug. 17, 2012, 24 pgs.
U.S. Appl. No. 13/535,189, Non Final Office Action dated Dec. 10, 2013, 14 pgs.
U.S. Appl. No. 13/535,189, Response filed Apr. 4, 2013 to Final Office Action dated Jan. 4, 2013, 12 pgs.
U.S. Appl. No. 13/535,189, Response filed Apr. 9, 2014 to Non Final Office Action dated Dec. 10, 2013, 13 pgs.
U.S. Appl. No. 13/535,189, Response filed Nov. 6, 2014 to Final Office Action dated Jun. 6, 2014, 11 pgs.
U.S. Appl. No. 13/535,189, Response filed Nov. 19, 2012 to Non Final Office Action dated Aug. 17, 2012, 11 pgs.
U.S. Appl. No. 13/594,472, Appeal Brief filed Dec. 18, 2015, 31 pgs.
U.S. Appl. No. 13/594,472, Examiner Interview Summary dated Apr. 18, 2014, 3 pgs.
U.S. Appl. No. 13/594,472, Examiner Interview Summary dated Sep. 17, 2014, 3 pgs.
U.S. Appl. No. 13/594,472, Examiner Interview Summary dated Dec. 26, 2014, 5 pgs.
U.S. Appl. No. 13/594,472, Final Office Action dated May 20, 2014, 20 pgs.
U.S. Appl. No. 13/594,472, Final Office Action dated Sep. 18, 2015, 29 pgs.
U.S. Appl. No. 13/594,472, Final Office Action dated Nov. 17, 2014, 23 pgs.
U.S. Appl. No. 13/594,472, Non Final Office Action dated Jan. 17, 2014, 12 pgs.
U.S. Appl. No. 13/594,472, Non Final Office Action dated Mar. 11, 2015, 21 pgs.
U.S. Appl. No. 13/594,472, Non Final Office Action dated Jul. 23, 2014, 22 pgs.
U.S. Appl. No. 13/594,472, Response filed Feb. 17, 2015 to Final Office Action dated Nov. 17, 2014, 14 pgs.
U.S. Appl. No. 13/594,472, Response filed Apr. 15, 2014 to Non Final Office Action dated Jan. 17, 2014, 12 pgs.

(56) References Cited

OTHER PUBLICATIONS

U.S. Appl. No. 13/594,472, Response filed Jun. 11, 2015 to Non Final Office Action dated Mar. 11, 2015, 22 pgs.
U.S. Appl. No. 13/594,472, Response filed Jun. 25, 2014 to Final Office Action dated May 20, 2014, 9 pgs.
U.S. Appl. No. 13/594,472, Response filed Oct. 22, 2014 to Non Final Office Action dated Jul. 23, 2014, 12 pgs.
Arrington, Michael, "Everyone Send Me $5", Tech Crinch Article and Comments,[Online]. Retrieved from the Internet: <URL:http://www.techcrunch.com/2006/02/15/everyone-send-me-5>, (Feb. 15, 2006), 13 pgs.
Australian Application Serial No. 11/493,112, First Examiner Report dated Mar. 10, 2009, 2 pgs.
Australian Application Serial No. 2006230277, Response filed Jan. 8, 2010 to First Examiner Report dated Mar. 10, 2009, 17 pgs.
Australian Application Serial No. 2009291867, Notice of Acceptance dated Jan. 20, 2014, 2 pgs.
Australian Application Serial No. 2009291867, Office Action dated Apr. 13, 2012, 3 pgs.
Australian Application Serial No. 2009291867, Response filed Jun. 25, 2013 to Subsequent Examiner's Report dated Nov. 6, 2012, 15 pgs.
Australian Application Serial No. 2009291867, Response filed Oct. 22, 2012 to Examiner's Report dated Apr. 13, 2012, 18 pgs.
Australian Application Serial No. 2009291867, Response filed Dec. 19, 2013 to Subsequent Examiners Report dated Jul. 11, 2013, 24 pgs.
Australian Application Serial No. 2009291867, Subsequent Examiners Report dated Jul. 11, 2013, 4 pgs.
Australian Application Serial No. 2009291867, Subsequent Examiner's Report dated Nov. 6, 2012, 4 pgs.
Australian Application Serial No. 2010201969, Office Action Response filed Feb. 15, 2012, 18 pgs.
Australian Application Serial No. 2012203359, Examiner's First Report dated May 8, 2013, 2 pgs.
Australian Application Serial No. 2012203359, Response filed Jul. 26, 2013 to Examiner's First Report dated May 8, 2013, 4 pgs.
Australian Application Serial No. 2013100556, Amendments Filed dated Apr. 20, 2015, 7 pgs.
Australian Application Serial No. 2013205572, Examination Report dated Apr. 3, 2014, 4 pgs.
Australian Application Serial No. 2013205572, Response filed Mar. 31, 2015, 22 pgs.
Australian Application Serial No. 2013205572, Subsequent Examiners Report dated Apr. 2, 2015, 3 pgs.
Australian Application Serial No. 2013205573, Examination Report dated Apr. 3, 2014, 4 pgs.
Australian Application Serial No. 2013205573, Response filed Mar. 31, 2015, 16 pgs.
Australian Application Serial No. 2013205573, Response filed Sep. 3, 2015, 14 pgs.
Australian Application Serial No. 2013205573, Subsequent Examiners Report dated Apr. 2, 2015, 3 pgs.
Australian Application Serial No. 2013245643, Office Action dated Jul. 8, 2015, 4 pgs.
Australian Application Serial No. 2013245643, Response filed Oct. 1, 2015, 24 pgs.
Australian Application Serial No. 2010201969, First Examiner Report dated Mar. 16, 2011, 2 Pgs.
Bank Mergers: Integration and Profitability, By Jane C. Linder, Dwight B. Crane, Journal of Financial Services Research 7:35-55 (1992), 1992 Kluwer Academic Publishers.
Canadian Application Serial No. 2,736,489, Office Action dated Apr. 9, 2013, 4 pgs.
Canadian Application Serial No. 2,736,489, Office Action dated May 5, 2016, 5 pgs.
Canadian Application Serial No. 2,736,489, Office Action dated May 29, 2014, 4 pgs.
Canadian Application Serial No. 2,736,489, Office Action dated Jun. 5, 2015, 8 pgs.
Canadian Application Serial No. 2,736,489, Response filed Oct. 7, 2013 to Office Action dated Apr. 9, 2013, 10 pgs.
Canadian Application Serial No. 2,736,489, Response filed Nov. 28, 2014 to Office Action dated May 29, 2014, 50 pgs.
Canadian Application Serial No. 2,736,489, Response filed Dec. 4, 2015 to Office Action dated Jun. 5, 2015, 18 pgs.
Canadian Application Serial No. 2,736,489, Voluntary Amendment filed May 13, 2011, 4 pgs.
Cheong, Yu C., "Payments In Mobile Commerce", Telecom Media Networks, Wireless Internet Centre, http://www.apc.capgemini.com/industry/telecom/attachments/Paymente/020in%20Mobile/020Commerce.pdf, (2002), 1-25.
Cheong, Yu Chye, "Payments In Mobile Commerce", Telecom Media Networks, Wireless Internet Centre, http://www.apc.capgemini.com/industry/telecom/attachments/Payments°/020in°/020Mobile/020Commerce.pdf, (2002), 1-25.
Chinese Application Serial No. 200680014449.7, Office Action dated Jul. 29, 2010, 4 Pgs.
Chinese Application Serial No. 200680014449.7, Response filed Dec. 13, 2010 to Non Final Office Action dated Jul. 29, 2010, 14 pgs.
Chinese Application Serial No. 200980144630.3 Office Action dated May 31, 2012, with English translation of claims, 9 pgs.
Chinese Application Serial No. 200680014449.7, Office Action dated Mar. 15, 2011, (4 Pgs.).
Choi, Hyungki, et al., "Design of secure mobile payment", ICU PowerPoint Presentation,(Apr. 3, 2002), 1-7.
Chudasama, J, "U-Commerce: Integrating business anywhere", [Online]. Retrieved from the Internet: <URL:http://web.archive.org/web/20040603011901/www.buzzle.com/editorials/text3-16-2004-51736.asp, (Accessed Apr. 17, 2009), 4 pgs.
Clarense, Tan N.W, et al., "From e-commerce to m-commerce: The power of the mobile Internet", Idea Group Publishing, (Jan. 2001), 33 pgs.
Contactless Payments: Devliering Merchant and Consumer Benefits, A Smart Card Alliance Report, (Apr. 2004).
Cricket Communications, "Get Customer Support—FAQ's", [Online]. Retrieved from the Internet: <URL: http://www.mycricket.com/Cust sve opt feat.aspx> (observed Feb. 2, 2005), (Copyright 2005), 6 pages.
Definition of Device, The American Heritage Dictionary of the English Language, [Online].Retrieved from Internet: <http://education.yahoo.com/reference/dictionary/>, (Accessed Dec. 5, 2013), 1 pg.
Ding, Melissa S., et al., "Reconsidering the Challenges of mPayments: A Roadmap to Plotting the Potential of the Future mCommerce Market", 16th Bled eCommerce Conference, eTransformation, Bled, Slovenia,(Jun. 9-11, 2003),873-884.
Euroepean Application No. 06739940.2, Extended European Search Report dated Dec. 21, 2009, 4 pgs.
European Application Serial No. 06739940.2, Examination Notification Art. 94(3) dated Apr. 8, 2014, 6 pgs.
European Application Serial No. 06739940.2, Extended European Search Report dated Dec. 21, 2009, 4 pgs.
European Application Serial No. 06739940.2, Office Action dated Jul. 9, 2015, 14 pgs.
European Application Serial No. 06739940.2, Response filed Aug. 15, 2014 to Examination Notification Art. 94(3) dated Apr. 8, 2014, 14 pgs.
European Application Serial No. 06739940.2, Summons to Attend Oral Proceedings mailed Feb. 24, 2015, 5 pgs.
European Application Serial No. 09813539.5, Examination Notification Art. 94(3) dated Jan. 8, 2013, 6 pgs.
European Application Serial No. 09813539.5, Extended Search Report dated Nov. 25, 2011, 4 pgs.
European Application Serial No. 09813539.5, Office Aciton dated Dec. 13, 2011, 1 pg.
European Application Serial No. 09813539.5, Office Action dated Apr. 19, 2011, 2 pgs.
European Application Serial No. 09813539.5, Response filed May 7, 2013 to Office Action dated Jan. 8, 2013, 16 pgs.
European Application Serial No. 09813539.5, Response filed May 19, 2011 to Office Action dated Apr. 19, 2011, 6 pgs.

(56) References Cited

OTHER PUBLICATIONS

European Application Serial No. 09813539.5, Summons to Attend Oral Proceedings mailed Dec. 5, 2013, 6 pgs.
European Application Serial No. 09813539.5-2221, Response filed Jun. 6, 2012 to Extended European Search Report dated Nov. 25, 2011, 14 pgs.
First National Bank, [Online]. Retrieved from the Internet: <URL:https://fnb.co.za/FNB/content/services/mobile/cellphoneBanking.scm1>, (Accessed Apr. 5, 2005), 2.
Focarelli, D., et al., "Why Do Banks Merge?", Journal of Money, Credit, and Banking vol. 34, No. 4, (Nov. 2002), 1047-1066.
Godfrey, Mike, "Panama Bank Merge to Form Biggest Banking Group in Central America", Tax-news.com, New York Tuesday, (May 2000), 5 pgs.
Hafner, K, ""Will That Be Cash or Cell Phone?: Wireless Payment Systems Might Mean Dialing Inot Your Own Wallet"", (Mar. 2, 2000).
Hafner, Katie, "Will That Be Cash or Cell Phone?: Wireless Payment Systems Might Mean Dialing Inot Your Own Wallet", Copyright 2009 The New York Time Company,[Online]. Retrieved from the Internet: <URL:, (Mar. 2, 2000), 4 pgs.
Hasegawa, Naoki, "Inspection: Facts about Use of Debit Card", Nikkei Digital Money System, No. 42,, (May 15, 1999), 6-11.
IEEE 100 The Authoritative Dictionary of IEEE Standards Terms, Seventh Edition.
Indian Application Serial No. 1890/CHENP/2011, Amendment filed May 9, 2011, 5 pgs.
International Application Serial No. PCT/US2006/011475, International Preliminary Report on Patentability dated Oct. 11, 2007, 5 pgs.
International Application Serial No. PCT/US2006/011475, International Search Report dated Dec. 12, 2006, 6 pgs.
International Application Serial No. PCT/US2006/011475, Written Opinion filed Dec. 12, 2006, 2 pgs.
International Application Serial No. PCT/US2007/20109, International Preliminary Report on Patentability dated Mar. 26, 2009, 7 pgs.
International Application Serial No. PCT/US2007/20109, Search Report and Written Opinion dated Sep. 4, 2008.
International Application Serial No. PCT/US2009/056367, International Preliminary Report on Patentability dated Mar. 24, 2011, 14 pgs.
International Application Serial No. PCT/US2009/056367, Search Report dated Dec. 15, 2009, 5 pgs.
International Application Serial No. PCT/US2009/056367, Written Opinion dated Dec. 15, 2009., 12 pgs.
International Application Serial No. PCT/US2013/056212, International Search Report dated Feb. 10, 2014, 4 pgs.
International Application Serial No. PCT/US2013/056212, Written Opinion dated Feb. 10, 2014, 6 pgs.
International Search Report and Written Opinion for Application No. PCT/US06/11475, dated Dec. 12, 2006, 7 Pages.
Jagolinzer, Philip, "Personal Financial Planning: How to divide the family income", Ohio CPA Journal vol. 54, No. 2, (Apr. 1995), 39-40.
Japanese Application Serial No. 2011-526305, Examiners Decision of Final Refusal dated Aug. 27, 2013, with English translation of claims, 5 pgs.
Japanese Application Serial No. 2011-526305, Office Action dated Mar. 19, 2013, with English translation of claims, 8 pgs.
Japanese Application Serial No. 2013-270639, Examiners Decision of Final Refusal dated Feb. 9, 2016, with English translation of claims, 8 pgs.
Japanese Application Serial No. 2013-270639, Notice of Rejection of Grounds dated May 12, 2015, with English translation of claims, 11 pgs.
Japanese Application Serial No. 2013-270639, Response filed Aug. 10, 2015, 7 pgs.
Korean Application Serial No. 10-2013-7009885, Amendment filed Sep. 15, 2014, 27 pgs.
Korean Application Serial No. 10-2013-7009885, Appeal filed Dec. 28, 2015, 3 pgs.
Korean Application Serial No. 10-2015-7010457, Office Action dated Apr. 26, 2016, with English translation of claims, 13 pgs.
Korean Application Serial No. 10-2015-7010457, Office Action dated Jun. 5, 2015, with English translation of claims, 7 pgs.
Korean Application Serial No. 10-2015-7010457, Response filed Dec. 7, 2015 to Office Action dated Jun. 5, 2015, 40 pgs.
Korean Application Serial No. 2011-7008082, Amendment filed Sep. 23, 2011, No English Translation, 30 pgs.
Korean Application Serial No. 2011-7008082, Appeal Brief filed Apr. 24, 2013, 11 pgs.
Korean Application Serial No. 2011-7008082, Notice of Final Rejection dated Dec. 20, 2012, with English translation, 10 pgs.
Korean Application Serial No. 2011-7008082, Office Action dated Sep. 18, 2012, With English Translation, 16 pgs.
Korean Application Serial No. 2011-7008082, Response filed Nov. 16, 2012 to Office Action dated Sep. 18, 2012, with English translation of claims, 39 pgs.
Korean Application Serial No. 2011-7008082, Trial Board Decision mailed Oct. 17, 2014, 14 pgs.
Korean Application Serial No. 2013-7009885, Decision of Final Rejection dated Sep. 23, 2015, with English translation of claims, 7 pgs.
Korean Application Serial No. 2013-7009885, Office Action dated Dec. 2, 2014, with English translation of claims, 10 pgs.
Korean Application Serial No. 2013-7009885, Response filed Apr. 22, 2015, 26 pgs.
Kreyer, Nina, "Characteristics of Mobile Payment Procedures", Proceedings of the ISMIS 2002, (2002), 1-13.
Kurumai, Noboru, "System Development Architecture & Support facilities (SDAS)", Fujitsu, issue of Jan. 2006, Japan, Fujitsu Limited, vol. 57, No. 1, (Jan. 10, 2006), 36-44.
Leavins, Wadhwa D, et al., "New Developments in Reporting Third-Party Payments to Attorneys.", Allied Academies International Conference.Academy of Accounting and Financial Studies. Proceedings, 7(2),, (Nov. 14, 2013), 61-66.
Lee, Chung-Wei, et al., "A System Model for Mobile Commerce", Proceedings of the 23rd International Conference on Distributed Computing Systems Workshops (ICDCSW03), (2003), 1 pg.
Lee, et al., A System Model for Mobile Commerce—, (2003).
Linder, J. C, et al., "Bank Mergers: Integration and Profitability", Journal of Finanical Services Research, (1992), 35-55.
Little, Arthur D, "Making M-Payments a Reality", Arthur D. Little Global M-Payment Report 2004, http://www.adlittle.de/downloads/artikel/MPayment press°/020release English Final.pdf, (2004), 1-5.
McKitterick, David, "State of the Art Review of Mobile Payment Technology", Trinity College Dublin—Computer Science Department, Technical Reports, (Jun. 13, 2003), 1-22.
Merriam Webster's Collegiate Dictionary 10th Ed., Merriam-Webster, Inc.,, (1993), p. 727.
Met Authorization for account based payment using SET Wallet Server, Version A, ((Feb. 21, 2001)).
Mobile Tech News, Ringtones made available using packaging 'short codes', [Online]. Retrieved from the Internet: <URL:http://www.mobiletechnews.com/info/2004/07/09/005946.html> (Observed Feb. 2, 2005), (Jul. 9, 2004), 27 pages.
Mobile Voucherless TopUp,the ideal African GSM Solution, © Copyright Prism Holdings,[Online]. Retrieved from the Internet: <URL: http://www.prism.co.za/main.asp?ID=751>,(Accessed Apr. 5, 2005), 2.
Ondrus, Jan , "Mobile Payments: A Tool Kit For A Better Understanding Of The Market", License Thesis—University of Lausanne, Jul. 2003 ,1-38.
Ondrus, Jan , et al., "A Disruption Analysis in the Mobile Payment Market", 38th Annual Hawaii International Conference on System Sciences (HICSS'05), (Jan. 3-6, 2005),1-10.
Panama Banks Merge to Form Biggest Banking Group in Central America, Mike Godfrey, Tax-news.com, New York Tuesday, May 23, 2000.
Panis, Stathis, et al., "Mobile Commerce Service Scenarios and Related Business Models", Proceedings of the 1st International Conference on Mobile Business, (Jul. 8-9, 2002), 10 Pages.

(56) References Cited

OTHER PUBLICATIONS

Peirce, Michael, "Multi-Party Electronic Payments for Mobile Communications", A thesis submitted for the degree of Doctor of Philosophy in Computer Science, University of Dublin,Trinity College, Department of Computer Science, (Oct. 31, 2000), 1-219.
PR Newswire, "U.S. Cellular Introduces Web Browser for Cell Phones", Copyright 0 1996-2003 PR Newswire Association LLC., [Online]. Retrieved from the Internet: <URL:http://prnewsire.com/computer-electronics/20041116/CGTU07616112004-1.html>,(Accessed Feb. 4, 2005), 2 pages.
Premier I-Dealer Agreement, [Online]. Retrieved from the Internet:<http://print.onecle.com/contracts/inphonic/t-mobile.sales.2003.07.01.shtml>, (Jul. 1, 2003), 1-56.
Prepaid Virtual Top Up, © Copyright Prism Holdings, http://www.prism.co.za/prepaidvirtual-topup.htm, PRISM Trusted Transactions, (Accessed Apr. 5, 2005), 1.
Prism VTU; Prepaid Voucherless Top-Up Solution (VTU), © Copyright Prism Holdings, [Online]. Retrieved from the Internet: <URL:http://www.prism.co.za/main.asp?ID=745&RootItemID=1>, (Accessed Apr. 5, 2005), 2.
Rodgers, Zachary, "SMS Short Codes come Alive on TV", [Online]. Retrieved from the Internet: <URL:http://web.archive.org/web/20030410191431/http://www.instantmessagingplanet.com/wireless/article.php/2118811> (Archived Apr. 10, 2003), (Mar. 19, 2003), 5 pages.
Rodgers, Zachary, "U.S. Wirelss Carriers Debut Universal Short Codes", [Online]. Retrieved from the Internet: <URL:http://www.instantmessagingplanet.com/wireless/article.php/3098231> (Observed Feb. 2, 2005),(Oct. 23, 2003), 4 pages.
Sony Ericsson P800/P802 Manual, (Jan. 2003), 64-65.
South African Application Serial No. 2011/01819, Amendment filed Jun. 6, 2011, 13 pgs.
Tanaka, Jun, "Entire Picture of Extreme Programming: Development of Ultimate Software", Nikkei Computer, issue of Jun. 4, 2001, Japan, Nikkei Business Inc., No. 523 (with summary of document in English), (Jun. 4, 2001), 64-69.
Tech Crunch Article and Comments, http://www.techcrunch.com/2006/02/15/everyone-send-me-5, (Feb. 15, 2006).
The Authoritative Dictionary of IEEE Standards Terms, IEEE 100, Seventh Edition IEEE Standards Information Network/IEEE Press, (Dec. 1, 2000), 37 pgs.
Using your Cellphone as a Credit Card, The Wall Street Journal Online. WSJ.com,[Online]. Retrieved from the Internet <URL:http://pgasb.pgarchiver.com/wsj/access/983215801.html?dids=983215801:983215801&FMT=FT&FMTS=>, (Feb. 8, 2006).
Varshney, Upkar, "A Framework for the Emerging Mobile Commerce Applications", Proceedings of the 34th Hawaii International Conference on System Sciences—2001,(2001), 1-10.
Webster's New World Dictionary of American English/Victoria E. Neaufeldt,editor in chief, 3rd Collegiate Edition, (1988), all pages.
Whois Source, "Common Short Code—CSC", [Online]. Retrieved from the Internet:<URL: http://www.whois.se/common-short-code/> (Observed Feb. 2, 2005), (Copyright 1998-2005), 2 pages.
Why Do Banks Merge?Author(s): Dario Focarelli, Fabio Panetta, Carmelo Salleo Source: Journal of Money Credit and Banking, vol. 34, No. 4 (Nov.,2002), pp. 1047-1066.
Entire Prosecution History of U.S. Appl. No. 09/633,962, titled Method for Managing Group Finances via an Electronic Network, filed Aug. 8, 2000.
Entire Prosecution History of U.S. Appl. No. 12/025,223, titled Method for Managing Group Finances via an Electronic Network, filed Feb. 4, 2008.
Entire Prosecution History of U.S. Appl. No. 12/752,976, titled System and Method for Managing Allocation of Funds Between a Plurality of Entities, filed Apr. 1, 2010.
Entire Prosecution History of U.S. Appl. No. 11/168,277, titled Mobile Device Communication System, filed Jun. 28, 2005.
Entire Prosecution History of U.S. Appl. No. 12/554,785, titled System and Method for Managing Allocation of Funds Between a Plurality of Entities, filed Sep. 4, 2009.
Entire Prosecution History of U.S. Appl. No. 12/941,944, titled Mobile Device Communication System, filed Nov. 8, 2010.
Entire Prosecution History of U.S. Appl. No. 11/095,411, titled Payment via Financial Service Provider Using Network-Based Device, filed Mar. 31, 2005.
Entire Prosecution History of U.S. Appl. No. 11/521,997, titled Payment Transactions via Substantially Instant Communication System, filed Sep. 15, 2006.
Entire Prosecution History of U.S. Appl. No. 12/207,383, titled Payment Application Framework, filed Sep. 9, 2008.
Entire Prosecution History of U.S. Appl. No. 12/572,125, titled Payment Application Framework, filed Oct. 1, 2009.
Entire Prosecution History of U.S. Appl. No. 12/752,985, titled Payment Application Framework, filed Apr. 1, 2010.
Entire Prosecution History of U.S. Appl. No. 13/535,189, titled Payment via Financial Service Provider Using Network-Based Device, filed Jun. 27, 2012.

* cited by examiner

PAYMENT VIA FINANCIAL SERVICE PROVIDER USING NETWORK-BASED DEVICE

CLAIM OF PRIORITY

This application is a continuation of U.S. application Ser. No. 11/095,411 filed Mar. 31, 2005, which application is incorporated in its entirety herein by reference.

FIELD

The disclosed subject matter relates generally to the technical field of data processing and, in one example embodiment, to a method and system of a making a payment to a third party via a financial service provider using a network-based device.

BACKGROUND

Vendors spend millions every year to advertise their products and services to potential client users. Often it is difficult to track the success of specific marketing campaigns. The vendor often does not know whether a particular television advertisement, for example, directly caused the consumer to buy their product. Knowledge of the specific prompt that caused the consumer to purchase may be very helpful to the vendor in crafting future successful advertising campaigns.

Order volume may be increased when client users immediately make a purchase in response to point of sale displays and other advertisements, for instance. Client users may be directed to physical locations, call centers, or websites where the client user directly interacts with the vendor or charity, or a distributor/representative thereof. Potential client users are often reluctant to make purchases, or to make donations because of the time involved in the transaction. As such, the vendor or charity often attempt to make the transaction as quick and as convenient as possible. The time involved for each client user may also include time to give credit card and/or other personal information, such as a shipment address. Additionally, many client users may be concerned about identity theft, and may be reluctant to give credit card or other personal information to the vendor or charity.

BRIEF DESCRIPTION OF THE DRAWINGS

Embodiments of the present invention are illustrated by way of example and not limitation in the Figures of the accompanying drawings, in which like references indicate similar elements and in which.

DETAILED DESCRIPTION

Embodiments describe a method and a system to receive a request associated with a third party at a financial service provider from a network-based device associated with a user. The system further includes a revenue share application configured to determine whether the transaction involves a plurality of third parties and to determine a payment share for each party of the plurality of third parties based on the transaction involving the plurality of third parties. A payment transfer module transfers the payment share from an account of the user to each account associated with each party of the plurality of third parties.

In the following description, for purposes of explanation, numerous specific details are set forth in order to provide a thorough understanding of embodiments of the present invention. It will be evident, however, to one skilled in the art that embodiments of the present invention may be practiced without these specific details.

In embodiments described with respect to FIGS. 1 to 6, the client user may use the identifier to order and pay for an offer associated with the third party through the network-based device and/or a mobile device. The user submits the identifier through the device to authorize payment transfer via the financial service provider to the third party, such as a vendor or a charity, as part of ordering a product, a promotion, or a service, or making a donation. The identifier may be submitted through a web browser on the device, through SMS messaging on the device, through IVR, through an application on the device, and/or through WAP, for example. The device may connect to the financial service provider over a network. The system may read a cookie or other identifier from the network-based device to automatically identify and/or authenticate the user. The payment may be transferred from the account of the user to the account of the third party via the financial service provider. The user account information, e.g. shipment address, may be given to the third party from the financial service provider along with the order, while the user payment details may not be given to the third party. For a donation, user account information may be unknown to the charity.

Platform Architecture

Figure 1:
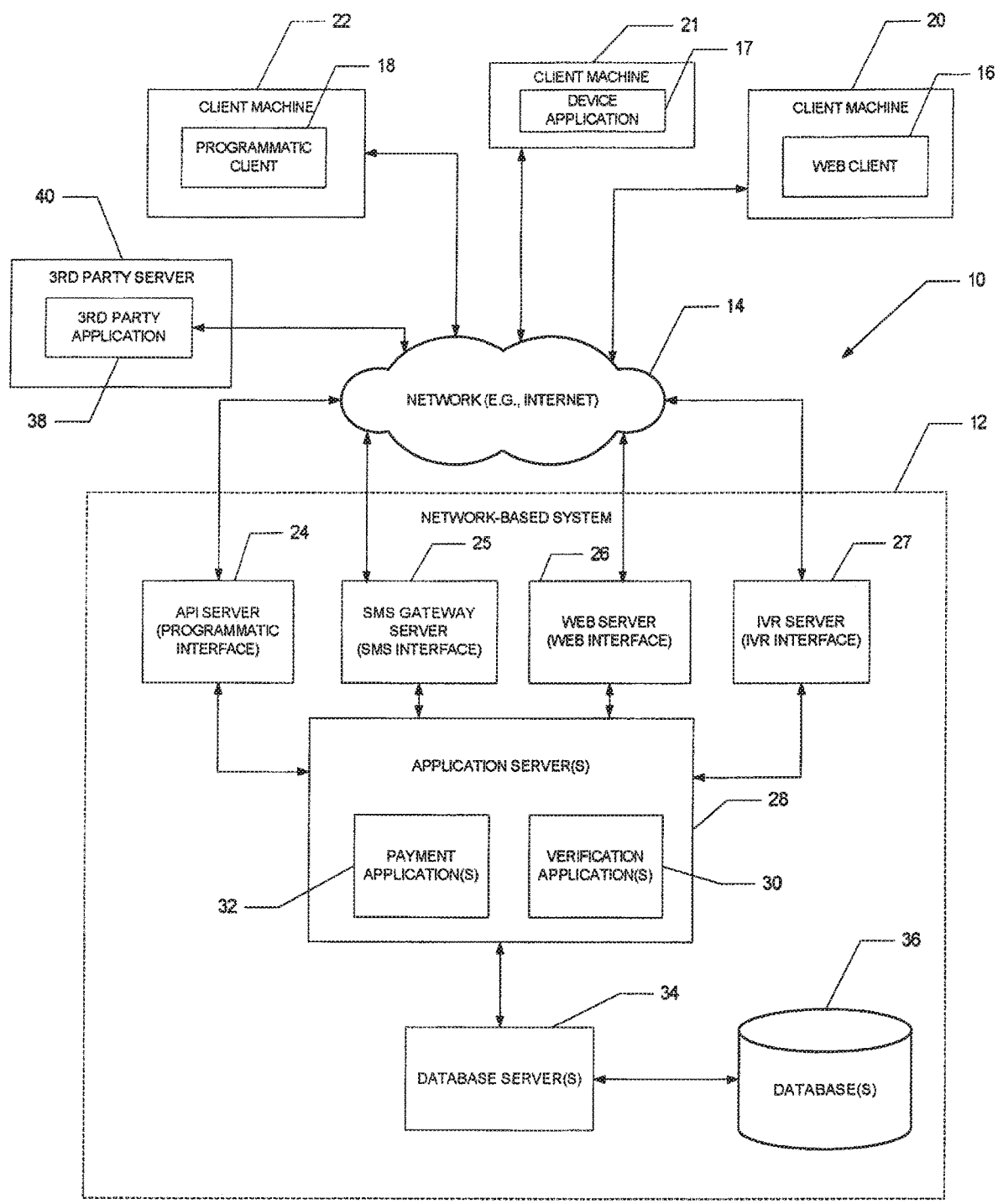
FIG. 1 illustrates a network diagram depicting a system, according to an example embodiment of the present invention, having a client-server architecture.

FIG. 1 illustrates a network diagram depicting a system 10 having a client-server architecture, according to an example embodiment of the present invention. A system, in the example form of a network-based system 12, provides server-side functionality, via a network 14 (e.g., the Internet, a public or private telephone network (wireline or wireless), a private wireless network using technologies such as Bluetooth or IEEE 802.11x or other networks) to one or more clients. FIG. 1 illustrates, for example, a web client 16 (e.g., a browser, such as the Internet Explorer® browser developed by Microsoft®), and a programmatic client 18 executing on respective client machines 20 and 22, e.g. on a network-based device. Additionally, a device application 17 may execute on a client machine 21. Further, while the system 10 shown in FIG. 1 employs a client-server architecture, embodiments are of course not limited to such an architecture, and could equally well find applications in a distributed, or peer-to-peer, architecture system.

The client machines, including network-based device(s) 20, 21, 22, may include a mobile device, a palmtop computer, a laptop computer, a desktop computer, a personal digital assistant, a cellular telephone, a communications device, a wireless telephone, a land-line telephone, a control system, a camera, a scanner, a television, television cable, a telephone with a web browser, a facsimile machine, a printer, a pager, and/or a personal trusted device. The device 20, 21, 22 may include a card, such as a smart card, a magnetic card, and/or a key card. The device may include a telephone or any device capable of Short Messaging Service (SMS) messaging, multimedia messaging service (MMS) messaging and/or generating audio tones, such as dual-tone multi-frequency (DTMF) tones. The device may be browser-enabled. The device may engage in an interactive message and/or open communication session, such as SMS, electronic mail, xHTML, Wireless Application Protocol (WAP), web, interactive voice response (IVR) and/or other mobile interfaces. The interactive messaging or open communication session may involve multiple technology modalities, e.g. the client user may engage the system via SMS and receive a responsive communication from the IVR Server or as an SMS with an embedded hyperlinked URL directing the client user's device to a WAP or web page. A hyperlinked URL may be delivered directly to the device from the application server(s) 28 and may be used to access a web site or a microbrowser, such as a WAP site. The device 20, 21, 22 may enable mobile videophone communications, digital television signals, and/or digital radio signals. The device may include a receiver to receive near field communications as described in more detail herein. The scanner device may include a bar code reader/scanner, a Radio Frequency Interface System (RFIS) reader, and/or a symbol reader/scanner.

Turning specifically to the network-based system 12, an Application Program Interface (API) server 24, a Short Messaging Service (SMS) Gateway Server 25, a web server 26, and an Interactive Voice Response (IVR) server 27 may be coupled to, and may provide programmatic, SMS, web, and IVR interfaces, respectively to, one or more application servers 28. The devices may use one or more of these interfaces to access the application server(s) 28.

For example, the web client 16 may access the application server(s) 28 via the web interface supported by the web server 26. The web interface may include a web browser or any microbrowser, such as xHTML or WAP. Similarly, the programmatic client 18 accesses the various services and functions provided by the application server(s) 28, via the programmatic interface provided by the API server 24 and/or the web server 26. In an additional embodiment, an application supported by one or more applications of the application server(s) may be downloadable to the network-based device. The device(s) may host the interface associated with the one or more applications of the application server(s) 28. The interface on the device may be an API interface, an SMS interface, a web interface, and/or an IVR interface. Consumer wireless device platforms, such as Java 2 Platform Micro Edition (J2ME), J2SE and J2EE allow developers to use Java and a wireless toolkit to create applications and programs for the device 22. The J2ME interface may include an application programming interface (API) for the device. The application of the programmatic client may also access the Internet using, for example, Binary Runtime Environment for Wireless (BREW).

The device application 17 executed on the client machine 21 may access the application server(s) 28 via the web interface of the web server. The application 17 may be selected on the device and the Internet may be launched in a background. The application 17 may additionally or alternatively access the server(s) 28 via the IVR interface of the IVR server 27, via the SMS interface of the SMS Gateway server 25, and/or via the programmatic interface of the API server 24. In an embodiment, the downloaded application described herein may include the device application 17.

The application server(s) 28 may host one or more verification application(s) 30 and one or more payment application(s) 32. The application server(s) 28 are, in turn, shown to be coupled to one or more database servers 34 that facilitate access to one or more databases 36. The verification application(s) 30 may provide verification of an order. Verification may include analysis of the order, such as from an identifier 166, to ensure that the identifier corresponds with a third party offer in the database(s) 36. Further, verification may include ensuring that the offer, such as a product, a service or a donation opportunity, still exists from the third party. Verification may additionally or alternatively include inventory analysis with respect to the offer, e.g. verifying the product is in stock. The verification application(s) 30 may communicate with a third party application 38 executing on a third party server 40 to determine if the identifier corresponds with the third party offer, to determine if the offer still exists, and/or to determine if the product is in stock, for example.

Figure 4:
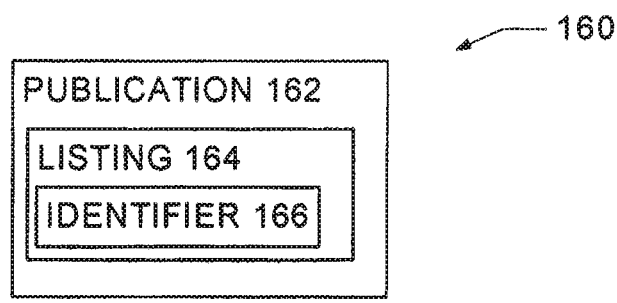
FIG. 4 illustrates an interface according to an example embodiment.

The payment application(s) 32 may provide a number of payment services and functions to users, such as client users. The payment application(s) 32 may allow users to accumulate value (e.g., in a commercial currency, such as the U.S. dollar, or a proprietary currency, such as "points") in accounts, and then later to redeem the accumulated value for an offer (e.g., goods, services, promotions, or donation opportunities) offered via a listing 164, as shown in FIG. 4. The payment applications, e.g. a financial service provider, may also extend credit to user, and/or may also have access to other funding sources to complete transactions—e.g. a credit card, a bank account, and/or a credit line. The financial service provider may operate as a money transmitter or a bank, for instance, and may operate using the payment application(s) 32.

The third party or vendor may receive from the payment application(s) and/or the financial service provider (FSP): information regarding a requested order for a product, a service, or a donation amount (e.g. the identifier), information regarding the shipment address specified by the client user, and the payment confirmation from the financial service provider as specified above. The payment application(s) and/or the financial service provider may secure financial information of the client user with respect to the third party. The FSP may not be sharing the financial information of the client user with the third party. For example, the payment may be received by the third party exclusive of the payment method and/or financial information of the client user, including credit card information, bank information and/or other client user account information.

The device 20, 21, 22 may host the interface associated with the payment application(s) 32 of the server(s) 28. The web client 16, the device application 17, and/or the programmatic client 18 may be associated with the financial service provider (FSP). In an additional embodiment, the web client 16, the device application 17, and/or the programmatic client 18 may be associated with the third party application 38.

The payment application(s) and/or the financial service provider may have an infrastructure to pay a plurality of vendors for a plurality of transactions each day. The payment application(s) and/or the financial service provider may operate independent of the third party. The payment application(s) and/or the financial service provider may be related to the third party, in other embodiments.

The payment applications 32 may also be implemented as a standalone software program, which does not necessarily have networking capabilities. In this embodiment, the device may be directly connected to the payment application(s) 32, without using the network 14.

The payment application(s) and/or the financial service provider may have access to the database 36 having, for example, the personal user account information through, for example, the database server(s) 34. The user account information may include payment information associated with the client user and an address destination of the client user, for example. The web client 16, the device application 17, and/or the programmatic client 18 may operate a program supported by the one or more database server(s) 34. The database server(s) 34 may support one or more account information links on a user interface of the network-based device, for example, using the web client 16. By accessing the database server(s) 34, the client user may add, amend or delete account information of the client user, among other information. In an embodiment, the client user may select a default shipment address and a default payment method in the payment application(s) discussed herein. Depending on whether goods are purchased, a service is requested, a donation is made, or a promotion is selected, a default shipment address, e.g. electronic mail address or a residential address, a business addresses, or a P.O. Box, may be selected by the client user in the payment application(s). One of the default payment methods may include direct transfers from system account balances, internal credit, a gift certificate, a bank account, a debit card, buyer credit, and/or a credit card.

The network 14 may include a mobile telephone network, a wireless wide area network (WWAN), a wireline telephone network, a wireless local area network (wireless LAN or WLAN), a wireless Metropolitan Area Network (MAN), and/or a wireless personal area network (PAN) (e.g., a Bluetooth® network). Other network-based technologies that may be used to connect include PON, VSAT satellite, Micro-impulse Radar, Radio Frequency identification (RFID), UltraWide Band, and/or Infrared. The network-based device may connect to the web using mobile internet exchange, e.g. Wireless Application Protocol (WAP) and/or Hypertext Transport Protocol (HTTP).

The network 14 may allow the network-based device 20, 21, 22 to communicate with the third party, e.g. a vendor or a charity, and/or to communicate with the payment application(s) and/or the financial service provider, among others having the capability to communicate through any various means.

FIG. 1 also illustrates the third party application 38 as having programmatic access to the network-based system 12 via the programmatic interface provided by the API server 24. For example, the third party application 38 may, utilizing information shared with the network-based system 12, support one or more features or functions on any virtual or physical medium, such as a web site, billboard, or magazine, hosted by the third party. The third party website may, for example, provide one or more promotional, marketplace or payment functions that are supported by the relevant applications of the network-based system 12. For example, the third party website may display an interface similar to an interface 160 of FIG. 4.

The verification application(s) 30 may communicate with the third party application 38 to verify an order, as discussed above. The third party may receive, from the payment application(s) and/or verification application(s), order information, shipment information, and an associated payment and/or payment confirmation. The third party application 38 may receive and process the order, send a virtual receipt to the payment application(s) 32, and forward the order to the client user. For services and/or donations, the third party may receive a requested order and the payment confirmation, exclusive of the user contact information, such as a shipment address. In an additional embodiment, the service provider or charity may receive client user contact information and may send a receipt to the client user.

Application Server(s)

Figure 2:
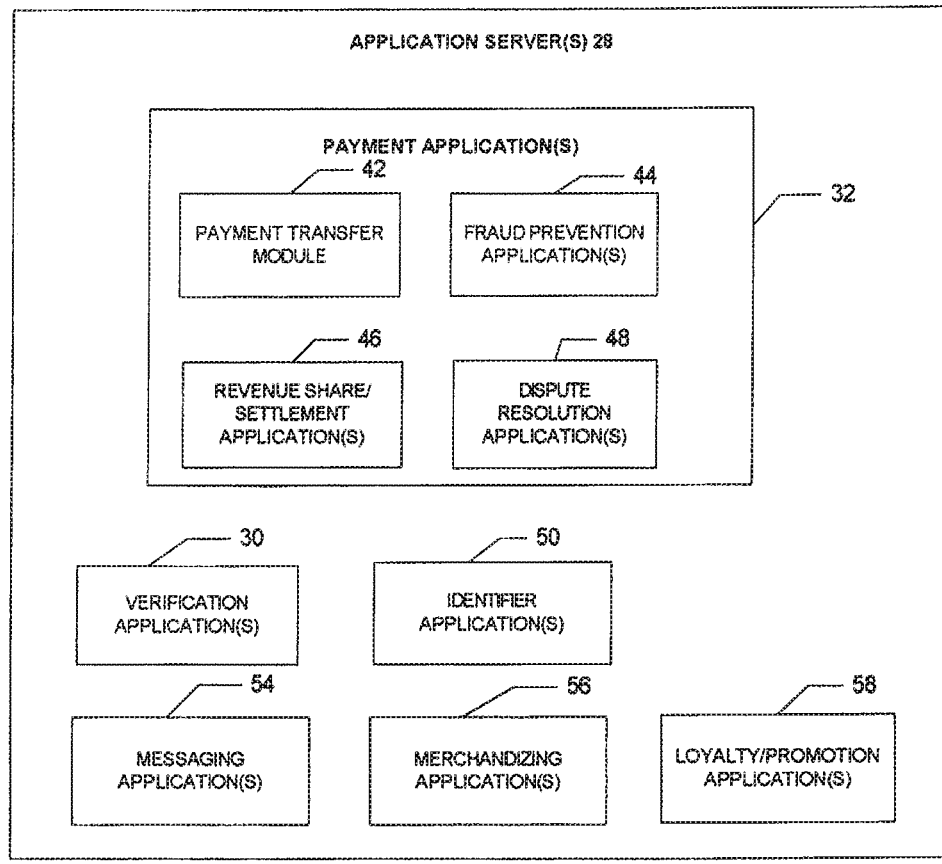
FIG. 2 illustrates a block diagram showing an application server in an example embodiment of the present invention.

FIG. 2 illustrates a block diagram showing application server(s) that are part of the network-based system 12, in an example embodiment of the present invention. In this embodiment, the payment application(s) 32, the verification application(s) 30, identifier application(s) 50, messaging application(s) 54, merchandizing application(s) 56, and/or loyalty/promotion application(s) 58 may be hosted by the application server(s) 28 of the network-based system 12.

The payment application(s) 32 may include a payment transfer module 42, fraud prevention application(s) 44, revenue share/settlement application(s) 46, and/or dispute resolution application(s) 48.

The payment transfer module 42 may, responsive to the server(s) receiving the identifier 166 (of FIG. 4), transfer a payment from the user to the third party via the payment application(s) and/or the financial service provider. The payment may be automatically transferred, as discussed herein.

The fraud prevention application(s) 44 may implement various fraud detection and prevention mechanisms to reduce the occurrence of fraud within the system 12. The fraud prevention application(s) may prevent fraud with respect to the third party and/or the client user in relation to any part of the request, payment, information flows and/or request fulfillment. Fraud may occur with respect to unauthorized use of financial instruments, non-delivery of goods, and abuse of personal information.

The revenue share/settlement application(s) 46 may distribute payments associated with an order to multiple accounts. For example, two independent third parties, such as a content provider and a content distributor, may each receive a certain percentage of a sale in their respective accounts.

The dispute resolution application(s) 48 may provide mechanisms whereby disputes arising between transacting parties may be resolved. For example, the dispute resolution applications 48 may provide guided procedures whereby the parties are guided through a number of steps in an attempt to settle a dispute. In the event that the dispute cannot be settled via the guided procedures, the dispute may be escalated to a mediator or arbitrator.

The identifier application(s) 50 may generate the identifier 166 based on selected criteria, e.g. the source (the third party) associated with the offer, the type of offer (service, product, promotion, donation opportunity) and/or the placement of the identifier (television ad, magazine ad, and/or client user device).

The identifier application(s) 50 may be associated with an identifier prompt, such as a prompt link on the network-based device. For example, the prompt link may be a web link and the client user may "click through" the hypertext link on the network-based device to be presented with a webpage interface supported by the application(s) 32. The prompt link may additionally or alternatively use WAP, SMS/MMS, WR, and/or J2ME, as described herein. The link may allow the client user to submit the identifier to authorize a payment to the third party, e.g. as part of a product request.

The third party application(s) 38 may keep track of success levels for respective marketing and advertisement campaigns by monitoring identifiers associated with each point of sale. The identifier application(s) 50, for instance, may receive the identifier 166 upon submission thereof through the device by the client user, and may forward the appropriate data to the third party application(s) 38. Additionally or alternatively, the identifier application(s) 50, for instance, or another application server may track success levels of campaigns and provide this information to the third party, for instance.

The application server(s) 28 may include messaging applications 54. The messaging applications 54 are responsible for the generation and delivery of messages to client users and third parties of the network-based system 12. Such messages, for example, advise client users regarding the status of products (e.g., providing "out of stock" notices to client users). Third parties may be notified of a product order, payment confirmation and/or shipment information. The messaging application(s) 54 may use SMS, IVR, email, or any other appropriate messaging application.

The network-based system 12 itself, or one or more parties that transact via the system 12, may operate merchandising programs that are supported by one or more merchandising applications 56. The merchandising applications 56 support various merchandising functions that are made available to third parties to enable sellers to increase sales via the system 12. The merchandising applications 56 also operate the various merchandising features that may be invoked by third parties, and may monitor and track the success of merchandising strategies employed by the third parties. For example, the merchandising application(s) 56 may monitor efficacy of particular merchandising campaigns using associated identifiers that may be used in the ordering process, as described herein.

The network-based system 12 itself, or one or more parties that transact via the system 12, may operate loyalty programs and other types of promotions that are supported by one or more loyalty/promotions applications 58. For example, a buyer/client user may earn loyalty or promotions points for each transaction established and/or concluded with a particular seller/third party, and may be offered a reward for which accumulated loyalty points can be redeemed.

Data Structures

Figure 3:
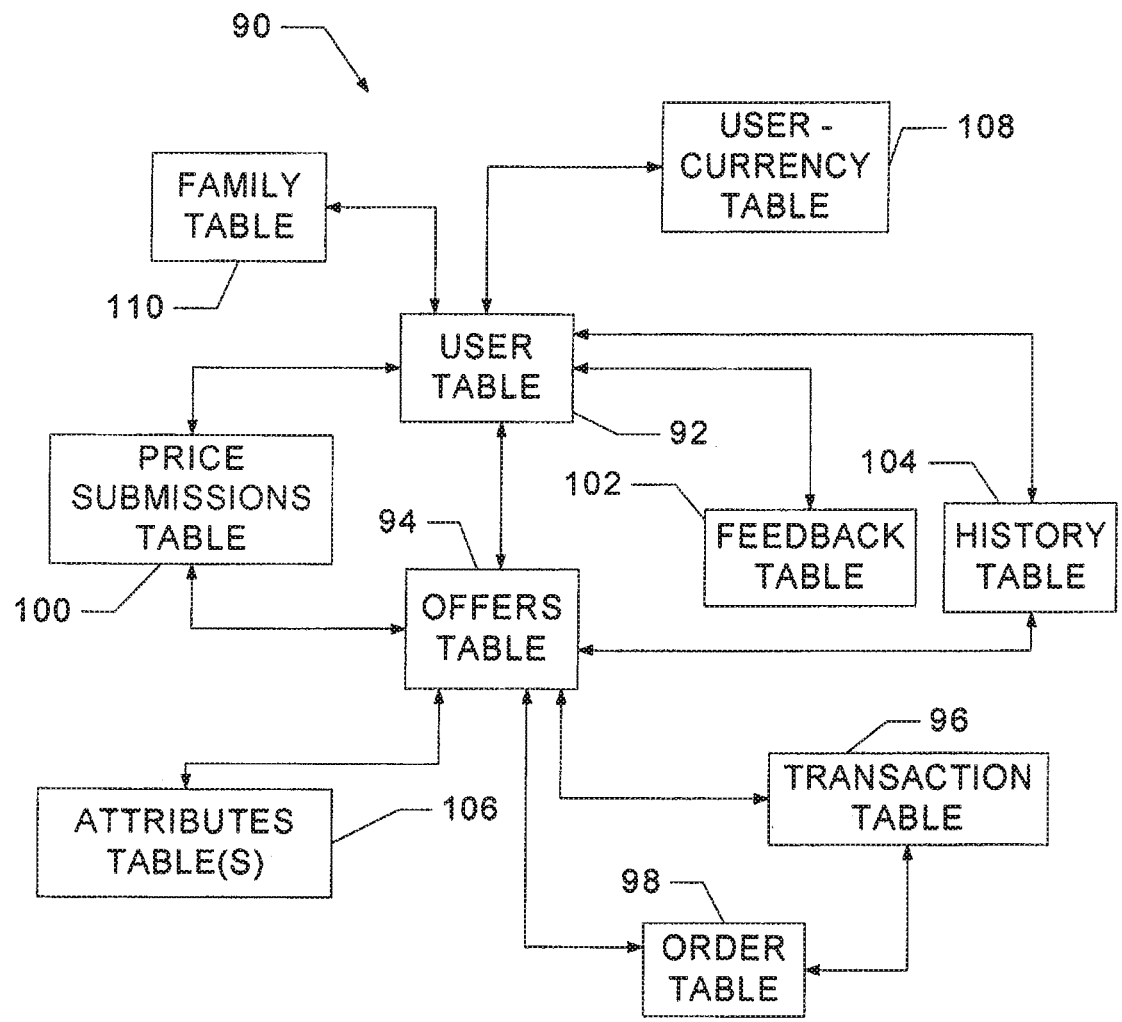
FIG. 3 illustrates a high-level entity-relationship diagram, illustrating various tables that may be maintained within one or more databases, according to an example embodiment.

FIG. 3 illustrates a high-level entity-relationship diagram, illustrating various tables 90 that may be maintained within the databases 36 according to an example embodiment. The tables 90 may be utilized by and support the application(s) of the application server(s).

The tables 90 may include a user table 92. The payment application(s) and/or the financial service provider may access the user table and/or may utilize the user table through the database server(s) 34, as described herein. The user table 92 may contain a record for each registered user of the network-based system 12, and may include user identification information, address information (including default address), financial instrument information (including default payment method, currency information), and other information (e.g. wireless carrier) pertaining to each such registered user. A user may, it will be appreciated, operate as a seller, a buyer, or both, within the network-based system 12. In an example embodiment of the present invention, a buyer may be a client user that has seen an identifier associated with an offer in a magazine advertisement and submits the identifier through the network-based device.

The tables 90 may also include an offers table 94 in which are maintained offer records for products, donations, promotions, and services that are or have been, available to be transacted via the system 12. Each offer record may include the offer information, the price, timing of the offering, and other offer related information. Each offer record within the offers table 94 may furthermore be linked to one or more user records within the user table 92, so as to associate a seller, e.g. the third party, and one or more actual or potential buyers, e.g. a client user, with each offer record. In an additional or alternative embodiment, the offers table 94 may be external to the system 12, maintained by one or more third party servers, and accessed by one or more application server(s) 28 through one or more interfaces 24, 25, 26, 27.

The tables 90 may include a transaction table 96. The transaction table 96 contains a record for each transaction (e.g., a purchase transaction) pertaining to products for which records exist within the offers table 94. The transaction table may include information such as the buyer, the seller, the offer, the price paid, the transaction mechanics, and other transaction-related information.

The tables 90 may include an order table 98. The order table 98 is populated with order records, each order record being associated with an order. Each order, in turn, may be with respect to one or more transactions for which records exist within the transactions table 96.

The tables 90 may include a price submissions table 100. Price submission records within the price submissions table 100 each relate to a price submission received at the network-based system 12. The price submission table may include the bids received in connection with the offer, for instance. The price submission received may additionally or alternatively be in connection with the identifier supported by the identifier application(s) 50, a request 695 (of FIG. 9) supported by the request application(s) 52, an auction-format offer supported by an auction application(s) 528 and/or a fixed-price offer supported by an fixed-price application(s) 520 of FIG. 7.

The tables 90 may include a feedback table 102. The feedback table 102 is utilized by one or more reputation applications 534 (of FIG. 7), in an example embodiment, to construct and maintain reputation information concerning users, including client users and third parties.

The tables 90 may include a history table 104. The history table 104 maintains a history of transactions to which a user has been a party.

The tables 90 may include one or more attributes tables 106. The attributes tables 106 record attribute information pertaining to products for which records exist within the offers table 94. Considering a single example of such an attribute, the attributes tables 106 may indicate a currency attribute associated with a particular product. The currency attribute may identify the currency of a price for the relevant product as specified by a seller. A family table 110 and user-currency table 108 may be used to support related products and multiple currencies in transactions.

Interface

FIG. 4 illustrates an interface 160 according to an example embodiment. The interface 160 may include a publication 162 published on one or more marketplace mediums, e.g. virtual or physical. The third party, for instance, may publish the publication 162 on a billboard, a sign, a television, the Internet, a magazine, a verbal publication, a website, such as a third party website, or any other physical or virtual marketplace medium. In an additional embodiment, a user interface (e.g., a web page, SMS, IVR, downloaded application) may receive the publication 162 from the third party and/or from the application server(s) in response to a query initiated by the client user.

In an example, as shown in FIG. 4, the identifier 166 associated with a listing 164 may be published in the publication 162. As discussed herein, the listing 164 may describe an offer (e.g., goods or services or charitable donations or promotions), which may be supported by any of the applications discussed with regard to FIGS. 1 and 2. The listing 164 in the publication 162 may be associated with the identifier 166, which may be specific to a particular offer. The listing 164 may include multiple offers with multiple respective identifiers.

The identifier 166 may include a request code suitable for entry, by a user, into the network-based device so as to allow payment application(s) 32 to identify the relevant product, service, and/or donation. The identifier 166 may include a code, a product-specific code, an alphanumeric code, a short code (e.g. SMS), a bar code, an electronic product code (EPC) and/or a symbol that may be scanned or read by the network-based device. The identifier may additionally include a telephone number and/or a short code.

The identifier 166 may include a wireless signal. The identifer 166 and/or the request 695 (of FIG. 9) associated with the offer may be submitted to the financial service provider in response to a near field communication. The wireless signal (e.g. the identifier) may be transmitted to the device 20, 21, 22 via Near field communication from the publication 162, for example. A transmitter and/or an IC chip may be embedded within the publication 162 to transmit the identifier and/or the request associated with the offer. The publication 162 may include a symbol (e.g. a logo) or another indication to the client user that the publication 162 includes the transmitter or chip that facilitates receipt of the identifier/request into the device. The device may have a "capture" indicator or button that may allow the client user to capture the wireless signal, with the associated identifier and/or the request associated with the offer. Alternatively, the transmitter may automatically transmit the identifier and/or offer information to the device, for example, when the device comes within a certain range of the publication. The device may have a receiver to receive the wireless signal. To accept the offer or to submit the request for the offer, the client user may submit the request to the financial service provider. The client user may, for example, press a "confirmation" button to send the request associated with the offer, may submit the request through IVR, or may submit the request through any other means.

The identifier 166 may be entered into and/or submitted through the network-based device 21 by the client user, as discussed herein, to authorize payment to the third party, e.g. as part of the product request or order. When the identifier is entered, the identifier may be verified, as discussed herein, and shipment information may be sent to the third party, as discussed herein.

Flowcharts

Figure 5:
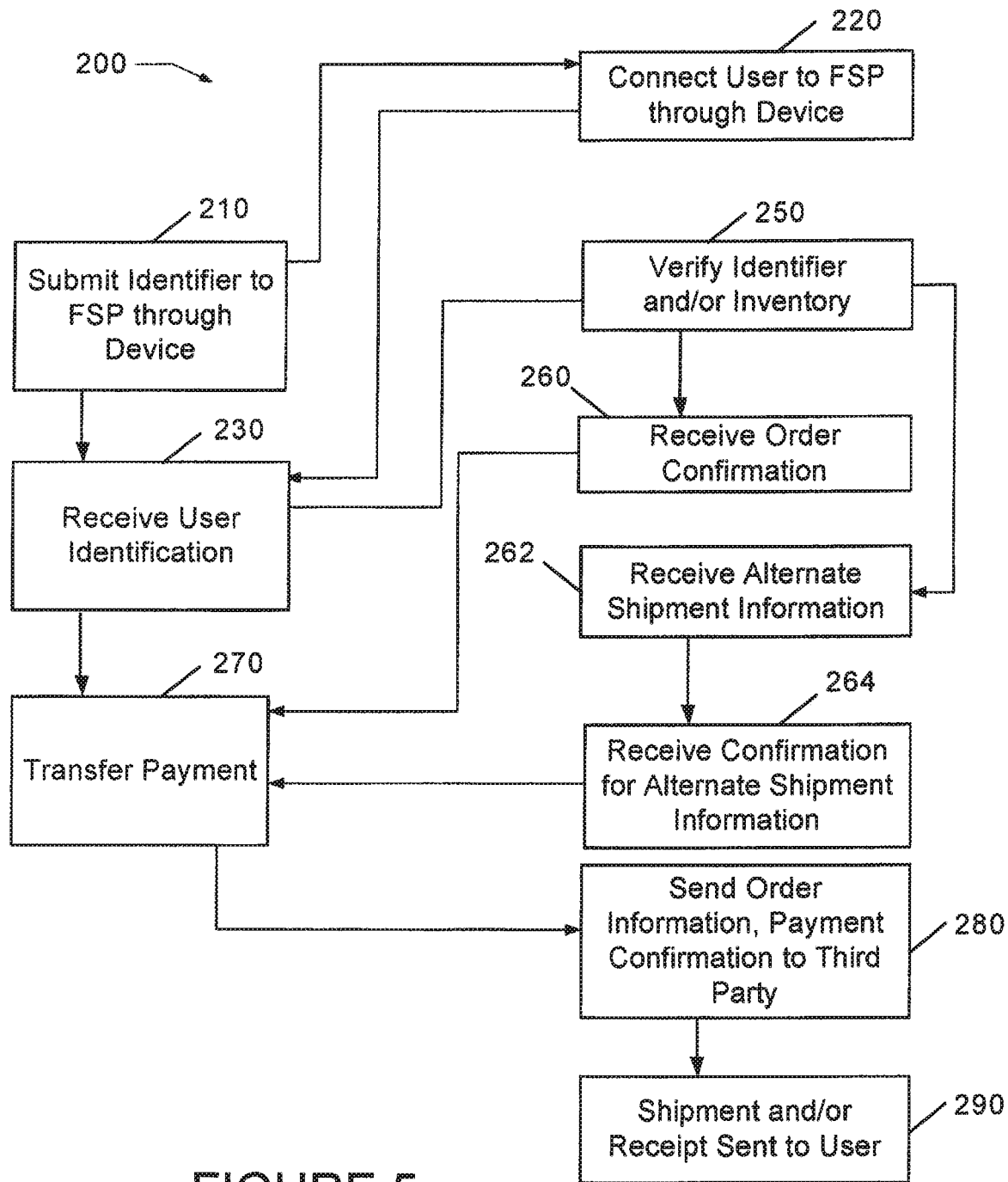
FIG. 5 illustrates a flow chart of a method, according to an example embodiment of the present invention.

FIG. 5 illustrates a flow chart of a method 200, according to an example embodiment of the present invention. The right side of the flow chart includes some optional embodiments in the method 200.

In response to submitting the identifier to the FSP, the system may optionally automatically transfer payment from the user to the third party via the financial service provider. In embodiments, 'automatically' may refer to the following: no other action on the part of the user is taken to pay the third party other than submission of the identifier 166. This automatic payment transfer may include the client user and/or the client user device registering or pre-registering with the FSP, for instance, as discussed in more detail herein. The user may be a confirmed or pre-confirmed client user within the user table 92. The system may connect with the FSP, and may optionally receive/authenticate user identification (e.g login & password or PIN), before transferring payment. The FSP may receive confirmation from the user regarding the order before payment is transferred. The identifier and/or the order may be verified before payment is transferred.

At block 210, the identifier 166 as discussed herein, is submitted to the FSP through the device to request and/or authorize payment to the third party, e.g. as part of the offer or product request. The identifier associated with the offer may be submitted in a message through SMS, for example. For identifiers that are associated with a product code, for instance, the identifier may be sent directly to the FSP as either the shortcode itself (e.g. where the product ID is associated with the short code) or in the message body of an SMS message (e.g. the shortcode connects the user to the FSP and the FSP retrieves the product code from the SMS message body). The identifier may also be submitted as part of the IVR/DTMF transaction in a telephone call, for example when prompted. The identifier associated with the product may also be entered or submitted in an appropriate field in response to the prompt associated with the device application 17 (on the phone or computer), in a website, e.g. the WAP page, and/or in a J2ME application. Each technical modality may have an interface (e.g. SMS, IVR) with an address (e.g. URL, shortcode, phone #). Any of these interfaces and/or addresses may be associated with the FSP or associated with the third party.

The identifier may be one of several identifiers included in the listing 164 as part of the publication 162 in the embodiment of FIG. 4. The identifier may indicate a selection and/or a donation/payment amount for a variable offer. Additionally or alternatively, the identifier may be submitted to indicate the request for the offer, and the user may be later prompted to submit another identifier associated with the selection. Additionally or alternatively, the identifier may be submitted to indicate the request for the offer and the selection may be submitted as another identifier together with the original identifier, e.g. after a space at the end of the original identifier, tagged onto the end of the original identifier, and/or at the beginning of the original identifier. In an example, the identifier may include a first part that identifies the third party and a second part that identifies the associated offer. The additional identifier may alternatively indicate a color selection, a model selection, a level selection, a gender selection, an age grouping selection, a size selection, a payment amount selection or any other optional selection. The selections may run in a string along with the identifier. In particular, a variable amount due may be entered upon a prompt (via the SMS interface, the IVR interface, the web interface, the application interface, and/or another interface)

asking the client user to enter an amount to pay for variable priced products, services, and/or charities or bid for auctions. The process may branch to block 220 or block 230 after the identifier is submitted.

At block 220, the user optionally connects to the FSP through the network-based device. The client user may connect with the FSP in a variety of ways. In an embodiment, the client user may connect with the FSP through an interactive, open session.

A transaction between the financial service provider (FSP) and the client user may be completed through the payment application(s) 32 utilizing, for example, IVR, J2ME, WAP or SMS, to authenticate and/or to communicate. Other systems such as Voice over IP (VoW) and Session Initiation Protocol (SIP) may also be used.

The user may connect to the FSP before submitting the identifier at block 210, or may connect to the FSP after submitting the identifier, as shown in this embodiment. The identifier 166 associated with an offer (e.g. product, service, promotion, or donation acceptance) of the third party may be submitted by the user into the network-based device to initiate connection with the FSP. The identifier 166 may include contact information, e.g. a phone number, a short code, a WAP site, or any other types of contact, such as directing the client user to launch their programmatic client (e.g. J2ME or BREW application).

The identifier may include a telephone number associated with the FSP, wherein connecting the client user with the FSP includes dialing the telephone number, and the communication connection may be through IVR. In another example, the identifier may be submitted as a short code, wherein connecting the client user with the FSP includes submitting the short code in an SMS or MMS communication through the network-based device. Connecting the client user with the FSP may additionally or alternatively include the web client 16 of the network-based device. The user may connect with a web or WAP site associated with the FSP and/or with the third party, as discussed in more detail in FIG. 6. Connecting the client user with the FSP may additionally or alternatively include opening the device application 17 on the network-based device 21 associated with the payment application(s).

At block 230, user identity may be received by the financial service provider (FSP) and/or the user identity may be assumed by the FSP. The user identity may be based on a variety of factors which may include device identification (e.g. verifying a wireless device ID or network IP address) as well as input from the fraud application(s). Additionally, the network-based device and/or the user may submit a second identifier to the FSP to determine the identity of the user. The second identifier may be a code entered by the user (e.g. login with a pin or with a password), a cookie retrieved from the device, voice recognition or any other type of identification. The fraud prevention application(s) 44 may determine whether the second identifier is solicited, and if so, whether it is solicited from the user and/or the client machine. The fraud prevention application(s) 44 may make the determination whether to solicit the second identifier on a case by case basis for each transaction.

The second identifier may include a user log in code, wherein the code includes, for example, a phone number/identification pair, a username/password pair, handwriting, and/or biometric methods, such as voice data, face data, iris data, finger print data, and hand data. In some embodiments, the user may not be permitted to login without appropriate authentication.

The system (e.g., the FSP) may alternatively automatically recognize the user, based upon the particular network-based device used, for example. Additionally, the system may automatically authorize the user to conduct transactions upon connection with the financial service provider through the payment application(s) 32, for example. The FSP may recognize the user from a cookie that has been previously deposited on the network-based device, to automatically recognize the user. In another example, the FSP may automatically recognize the user using any other method, including, a device phone number, a device serial number, voice recognition, caller ID code retrieved from the device, or any other identification type. The automatic recognition may also be considered the second identifier, in some embodiments.

The process may branch to block 250 or block 270 after the user identification is received at block 230.

At block 250, the identifier and/or order may optionally be verified as discussed herein. In particular, the verification application(s) may verify that the identifier submitted corresponds with a known product, service, promotion, or donation opportunity. The verification application(s) may also communicate with a database associated with the third party server to determine if the product, service, promotion or donation is still available and/or is in stock. The verification application(s) may also alternatively connect with the database server(s) 34 to determine if the product, service, promotion or donation is still available or is in stock.

Alternatively or additionally, the incorrect or wrong identifier may have been submitted by the client user and/or the client user may answer no to a query for confirmation at block 260. The client user may have an opportunity to enter or submit the correct identifier, and/or may have the option to first search for the product and its associated identifier on the system, as described herein with regard to embodiments described in FIGS. 7 to 10. The process 200 may branch to block 260 or to block 262.

At block 260, the system may optionally solicit and receive order confirmation from the client user. The application server(s) (e.g. the verification application(s), and/or the FSP) may send a message to the client user requesting confirmation of the specific product, service, donation opportunity or promotion associated with the identifier submitted, the payment details, and/or the shipment information. The shipment information to be confirmed by the client user may be retrieved from the database server(s) 34 by the FSP, for instance. The client user may confirm the shipment information and/or may edit the shipment information accordingly in optional block 262. The process may next move to block 270.

At block 262, the user may optionally edit the shipment information to send the product to an alternate address of the user. The client user may alternatively edit the shipment information to send the product, service, or promotion to a fourth party as, for example, a gift. The client user may also make a donation in the name of a fourth party. A contact identifier associated with a fourth party may be submitted to the FSP. The contact identifier may be an email address or a telephone number, for example. The contact identifier may be a moniker. The process may next move to block 264.

At block 264, the FSP may optionally contact the fourth party via the contact identifier and may request acceptance of the offer in a query. If the fourth party does not accept the offer (e.g., the gift), the order may be cancelled. If the fourth party does accept the product, the method 200 may proceed to block 270. The FSP may request that the fourth party establish an identification and/or an account when accepting the offer and/or when entering the default address. The client user may override the confirmation request (at block 264) to the recipient by providing shipment information, such as an address, of the recipient. The process may proceed to block 270.

At block 270, a payment for the offer is transferred from the client user to the third party via the FSP and/or the payment application(s) 32. For example, the financial service provider and/or the payment application may debit a system account of the client user and credit a system account of the seller or third party. In addition, the financial service provider and/or the payment application may charge the client user's credit cards, automatically withdraw funds from a bank account of the client user, or automatically withdraw funds from credit instruments associated with the FSP (e.g. including the PayPal® Buyer Credit technology). The financial service provider and/or the payment application may pay the third party and/or vendor by depositing funds into a system account or a bank account of the third party. In additional embodiments, the payments may be peer-to-peer, business-to-business, and/or consumer-to-business. The financial service provider may charge a transaction fee and/or a surcharge fee. The transaction and/or surcharge fee may be included in the price shown to the client user or buyer. The payment transferred from the client user may include the payment sent to the third party and the transaction/surcharge fee assessed by the financial service provider.

At block 280, one or more of the application server(s) 28 may optionally send order information and payment confirmation to the third party. The order information may include the identifier, and/or the particular product, service, donation opportunity or promotion, and/or shipment information.

At block 290, the third party may optionally process the order, and optionally ship (or otherwise provide) the product, service, or donation, if applicable. The product and/or receipt may be physically received at the default address destination of the client user. Additionally or alternatively, the client user may receive an electronic confirmation, such as a receipt or a voucher for a service or donation, via e-mail, web page update, device application update, a voicemail message, a text message, and/or a telephone message. The shipment/receipt may alternatively or additionally be sent by the application server(s). For example, the shipment may include a message sent to the network-based device, such as a link to download an application that is ordered by the client user, a message including a code to access a service that is ordered, or a message including ordered information, such as stock purchase information. In an embodiment where a donation is made, there may be no shipment and there may be a receipt sent to the user.

Using an embodiment of the method described, the security of the client user may be maintained with respect to the third party, while conducting order transactions in a relatively quick, open communication session.

Figure 6:
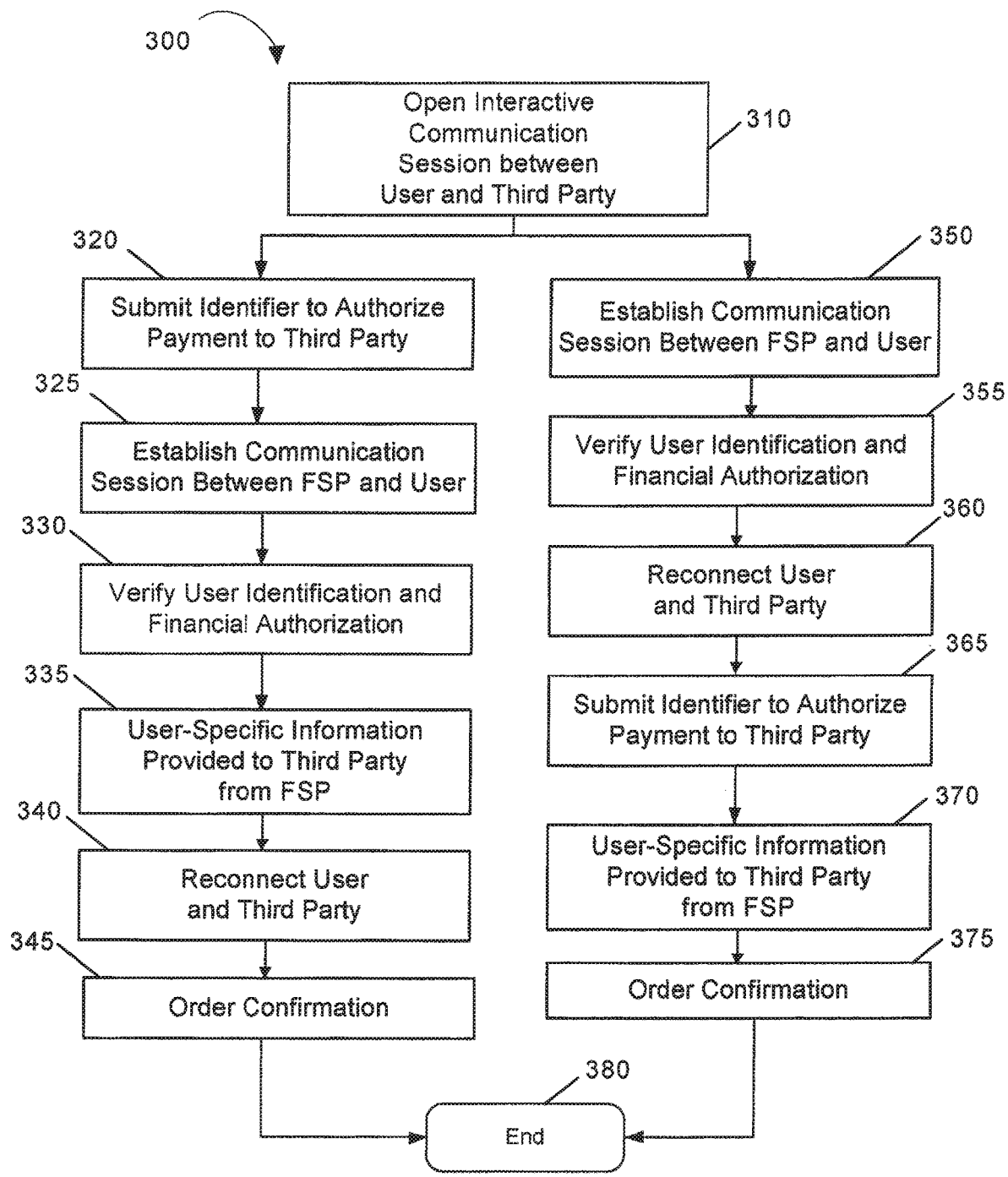
FIG. 6 illustrates a flow chart of a method, according to an example embodiment of the present invention.

FIG. 6 illustrates a flow chart of a method 300, according to an example embodiment of the present invention. Connecting the client user with the FSP may additionally or alternatively be through the third party. In an embodiment, the third party is considered a "trusted" third party. For example, using WAP, the user may see an advertisement of the trusted third party and connect with the third party. The offer may be selected by or requested by the user, e.g. the identifier may be submitted through the device. The user may then be connected with the FSP to authenticate and/or authorize payment. The user may additionally or alternatively then be reconnected with the third party.

At block 310 of method 300, a communication session between the client user and the third party may open. The communication session between the client and the third party may be similar to the communication session between the FSP and the client user as described at block 220. From block 310 the method 300 may branch to block 320 and to block 350.

At block 320, a request, e.g. the identifier or a product code, may be submitted to order the offer associated with the request and/or to authorize a payment to the third party. In another use scenario, the client user may simply wish to make a payment to the third party, e.g. as a donation, in which case the identifier may or may not be provided as part of a request. Additionally or alternatively, the request may be submitted as discussed more in regard to embodiments of FIGS. 7 to 10.

At block 325, following block 320, a communication session may be established between the client user and the FSP, for example, exclusive of the third party. The third party may not be privy to the communication between the FSP and the client user. The communication session may be similar to the communication session as described at block 220 (of FIG. 5). In the course of establishing the communication session with the FSP, the network device of the client user may provide certain identification information, e.g. the second identifier such as a PIN or password, to the FSP so as to enable the FSP to identify the client user. For example, where the network device is a mobile (or cellular) telephone, the telephone may provide information (e.g., the telephone number or device ID) to the FSP that enables the FSP to identify the client user. In another example, where the network device is a personal computer connected to the FSP via the Internet, information stored in a cookie, e.g. data previously "dropped" onto the user's personal computer, may be communicated to the FSP to again allow the FSP to identify the client user.

At block 330, following block 325, the FSP may optionally verify the client user identification (e.g. user login) and/or verify the financial authorization, as described herein.

At block 335, following block 330, client user-specific information is provided to the third party from the FSP. The client user-specific information may include a shipment address, payment, and/or payment confirmation. The payment confirmation may include confirmation that the payment is credited to the account of the third party. It will be appreciated that this client user-specific information may be identifiable by the FSP on account of the FSP previously having identified the client user at block 325. After the client user has been identified and/or authorized, the client user may be reconnected the third party to continue shopping and/or to receive order confirmation.

At block 340, which may follow block 330 or block 335, the client user may reconnect with the third party or with the website of the third party. The user information may be provided to the third party at block 335 substantially simultaneously with the user-third party reconnection, or may be provided after reconnection, or may be provided before the reconnection.

At block 345, the order for the product, service, or donation may be optionally confirmed. The payment may be sent by the FSP to the third party or an account on behalf of the client user upon confirmation. The confirmation may be a reply to a SMS message sent to the network-based device, in an example. The confirmation may also be a reply to a prompt on the web browser of the network-based device, or may be IVR confirmation or may be a reply thru the device application. The order confirmation may also take place while the client user is connected to the FSP at block 330.

At block 380, the method 300 may end.

The second branch of the method 300 at block 350 includes the client user connecting to the FSP, for example, exclusive of the third party. The third party may not be privy to the communication between the FSP and the client user for security purposes associated with the user. The connection may be similar to the communication session as described at block 220.

At block 355, the FSP verifies the client user identification and the financial authorization, as described herein and at block 330.

At block 360, the client user may reconnect with the third party or the website of the third party, as described herein and at block 340. After the FSP identifies and/or authorizes the client user, the client user may be reconnected with the third party to continue shopping.

At block 365, a request, e.g. the identifier, may be submitted to request an offer and/or to authorize a payment to the third party as described herein and at block 320.

At block 370, client user-specific information is received by the third party from the FSP. The client user-specific information may include a shipment address, payment and/or payment confirmation. The payment confirmation may be confirmation that the payment may be credited to the third party account. The user-specific information and/or financial authorization (e.g. shipment information and/or future purchase authorization) may alternatively be provided to the third party upon reconnection at block 360. Then, at block 370, payment and/or payment confirmation may be made. The FSP may remain open in a "background" while the client user remains connected with the third party.

At block 375, the order may be confirmed. The payment may be transferred upon confirmation. The order may be confirmed as described with regard to block 345.

At block 380, the method 300 may end.

FIGS. 7 to 10 illustrate at least one additional embodiment where the client user "shops" or searches, using one or more marketplace application(s) 510, for an offer associated with the third party. In these embodiments, the client user may not know the identifier associated with offer and/or may not use the identifier associated with offer to order and/or pay for the offer through the mobile device. Alternatively, there may not be an identifier associated with the specific offer. Many features of the embodiments described with regard to FIGS. 7 to 10 may also be features of the embodiments described with regard to FIGS. 1 to 6, and vice versa.

Application Server(s)

Figure 7:
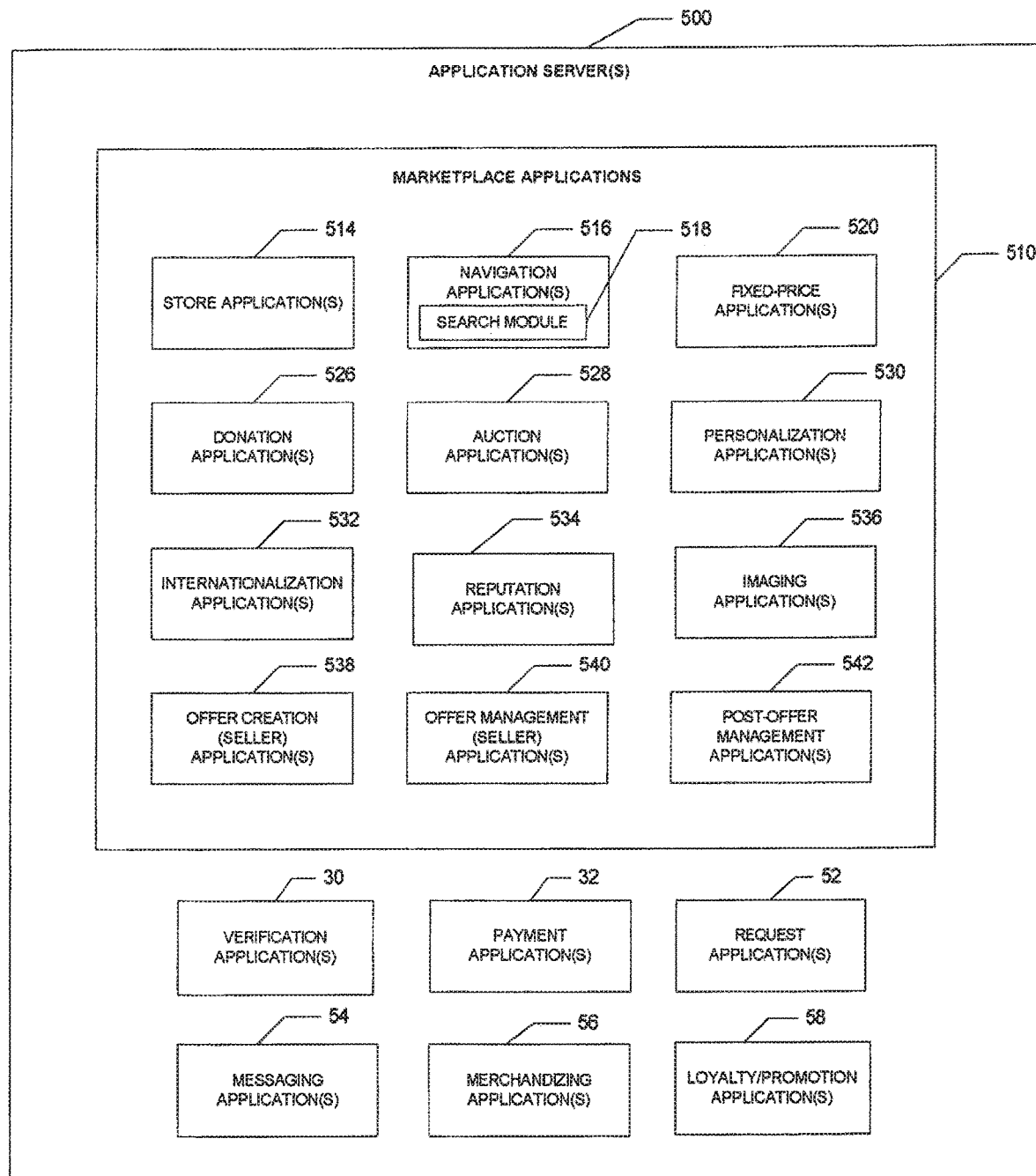
FIG. 7 illustrates a block diagram showing an application server in another example embodiment of the present invention.

FIG. 7 illustrates a block diagram showing application server(s) 500 that are part of the network-based system 12, in an additional example embodiment of the present invention. In this embodiment, the application server(s) 500 may host one or more marketplace application(s) 510, one or more verification application(s) 30, one or more payment application(s) 32, one or more request application(s) 52, one or more messaging application(s) 54, one or more merchandizing application(s) 56 and one or more loyalty/promotion application(s) 58. The application server(s) 500 may replace the application server(s) 28 of the network-based system 12.

The marketplace application(s) 510 may provide a number of marketplace functions and services to client users, such as a buyer, and/or to third parties, such as sellers or vendors, who access the system 12. The marketplace applications 510 may provide a number of offering mechanisms and price-setting mechanisms; whereby a seller may list goods or services for sale, a promotion or a donation opportunity, a seller may promote their offers, a buyer can express interest in or indicate a desire to purchase such goods or services or to donate, and a price can be set for a transaction pertaining to the goods or services, or donation opportunity.

The marketplace applications 510 may include one or more store applications 514. In an embodiment, the store applications 514 allow sellers to group their offers within a virtual store, which may be otherwise personalized by and for the sellers. Such a store may also offer promotions, incentives and features that are specific to and personalized by the respective seller.

The device 20, 21, and/or 22 may be used by the client user to search the virtual store of the store application(s) for a product, a service, a promotion, or a donation opportunity. The device may have an IVR interface, a web interface, an SMS or MMS interface, and/or a programmatic interface to allow the client user to search the store and to receive information about offers. When the product offer, the service offer, the promotion offer, and/or the donation opportunity is found or published, the client user may submit a request (e.g. the request 695 of FIG. 9) for the offer(s) through the mobile device, as described herein.

In particular, instead of submitting the identifier to the FSP through the device as described in block 210 of FIG. 5, the client user selects and/or submits the request 695 through the device to the FSP. For SMS communications, the client user may request a particular DVD, for instance. The system may publish a listing of offers, e.g. DVD names, from which the client user may select the order and send back. The client user may submit back the associated identifier with the offer. In other interfaces, such as WAP or IVR or J2ME, the client user may see and/or hear the selections and may click on the selection, enter the selection on a keypad of the device, and/or vocally indicate the selection. The connection through which the search and select process occurs may be thru IVR, SMS, or WAP or a downloadable application such as those designed with J2ME or BREW, for example. The remainder of the flow chart of FIG. 5 may be substantially the same, except in block 250, wherein instead of verifying the identifier, the request may be verified.

Navigation of the network-based system 12, including through the store application(s) 514, may be facilitated by one or more navigation applications 516. The one or more navigation application(s) may include a search module 518. The search may be conducted using an interface 600 of FIG. 8, and search results may be published as shown in interface 650 of FIG. 9.

The navigation application(s) may enable key word searches of products/services/promotions/donations published via the system 12. A browse application allows users to browse various category (e.g. music, books, offer price, shipping price), catalogue, or inventory data structures according to which products/services/promotions/donation may be classified within the system 12. Various other navigation applications may be provided to supplement the search and browsing applications.

The marketplace applications 510 may include one or more fixed-price application(s) 520. The fixed-price applications 520 support fixed-price offer formats and buyout-type offers. The fixed-price offer format may include, for example, the traditional classified advertisement-type offer, a catalogue offer, a television advertisement offer, a magazine offer, a website offer, an SMS offer, a data services offer, a billboard offer, a banner ad offer, or any other type of virtual or physical marketplace medium. The fixed-price offer in any of these listed formats may be considered the point of sale. The offer may be accepted by the client user by indicating consent to the offer, such as by submitting the request 695 and/or by submitting the identifier 166 through the device to the FSP. In an additional embodiment, the client user may use the navigation application(s) to find the fixed-price offer.

In an embodiment, buyout-type offers (e.g., including the Buy-It-Now (BIN) technology developed by eBay Inc., of San Jose, Calif.) may be offered in conjunction with an auction-format offer, and allow a buyer to purchase goods or services or make a donation, which are also being offered for sale via an auction, for a fixed-price that may be higher than the starting price of the auction. The buyout-type offer in any of these listed formats may be published in any virtual or physical marketplace medium and may be considered the point of sale. The offer may be accepted by the client user by indicating consent to the offer, e.g. by submitting the request 695 and/or by submitting the identifier 166 through the device to the FSP. In an additional embodiment, the client user may use the navigation application(s) to find the buyout-type offer.

The marketplace applications 510 may include one or more donation applications 526 that support the offer associated with a charitable institution and/or a specific charitable cause. The donation application(s) may also support the option of receiving variable payment amounts, as determined by the client user, for example. In a particular embodiment, the client user may use the navigation application(s) to find a charitable cause and may submit the request 695 associated with that charitable cause through the device to the FSP. If the request 695 is not associated with a donation amount, the client user may be prompted to submit a donation amount.

The marketplace applications 510 may include one or more auction applications 528 that support various auction-format offer and price setting mechanisms (e.g., English, Dutch, Vickrey, Chinese, Double, Reverse auctions, etc.). The various auction applications 528 may also provide a number of features in support of such auction-format offers, such as a reserve price feature whereby a seller may specify a reserve price in connection with an offer and a proxy-bidding feature whereby a bidder may invoke automated proxy bidding. The auction-format offer in any format may be published in any virtual or physical marketplace medium and may be considered the point of sale. The offer may be accepted by the client user by submitting the request 695 and/or by submitting the identifier 166 through the device to the FSP. In an additional embodiment, the client user may use the navigation application(s) to find the auction-format offer.

The marketplace applications 510 may include one or more personalization applications 530. The personalization application(s) 530 may allow third parties to personalize various aspects of their interactions with the system 12. For example the third party may, utilizing an appropriate personalization application 530, create a personalized reference page at which information regarding transactions to which the third party is (or has been) a party may be viewed. Further, the personalization application(s) 530 may enable a third party to personalize products and other aspects of their interactions with the system 12 and other parties, or to provide other information, such as relevant business information about themselves.

The marketplace applications 510 may include one or more internationalization applications 532. In one embodiment, the network-based system 12 may support a number of marketplaces that are customized, for example, for specific geographic regions. A version of the system 12 may be customized for the United Kingdom, whereas another version of the system 12 may be customized for the United States. Each of these versions may operate as an independent marketplace, or may be customized (or internationalized) presentations of a common underlying marketplace.

The marketplace applications 510 may include one or more reputation applications 534. The reputation applications 534 allow parties that transact utilizing the network-based system 12 to establish, build, and maintain reputations, which may be made available and published to potential trading partners. Consider that where, for example, the network-based system 12 supports person-to-person trading, users may have no history or other reference information whereby the trustworthiness and credibility of potential trading partners may be assessed. The reputation applications 534 allow a user, for example through feedback provided by other transaction partners, to establish a reputation within the network-based system 12 over time. Other potential trading partners may then reference such a reputation for the purposes of assessing credibility and trustworthiness.

In order to allow listings and/or products, available via the network-based system 12, to be published in a visually informing and attractive manner, the marketplace applications 510 may include one or more imaging applications 536. Third parties may upload images for inclusion within offer listings using J2ME, MMS, and WAP or other micro-browsers. An imaging application 536 also operates to incorporate images within viewed offered listings. The imaging application 536 may also operate to publish the identifier 166 associated with the listing 164 on the display 162. The imaging applications 536 may also support one or more promotional features, such as image galleries that are presented to potential buyers. For example, sellers may pay an additional fee to have an image included within a gallery of images for promoted offers.

The marketplace applications 510 may include one or more offer creation applications 538. The offer creation applications 538 allow sellers conveniently to author products pertaining to goods or services that they wish to transact via the system 12. Offer management applications 540 allow sellers to manage offers, such as goods, services, or donation opportunities. Specifically, where a particular seller has authored and/or published a large number of products, the management of such products may present a challenge. The offer management applications 540 provide a number of features (e.g., auto-reproduct, inventory level monitors, etc.) to assist the seller in managing such products. One or more post-offer management applications 542 also assist sellers with a number of activities that typically occur post-offer. For example, upon completion of an auction facilitated by one or more auction applications 528, a seller may wish to leave feedback regarding a particular buyer. To this end, a post-offer management application 542 may provide an interface to one or more reputation applications 534, so as to allow the seller conveniently to provide feedback regarding multiple buyers to the reputation applications 534.

The application server(s) 500 may include one or more request application(s) 52. The request application(s) 52 may operate similar to the identifier application(s) 50, and in some instances may be substantially identical to the identifier application(s) 50. The request application(s) 52 may be responsive to the request 695 selected with regard to the embodiment of FIG. 9.

User Interfaces

Figure 8:
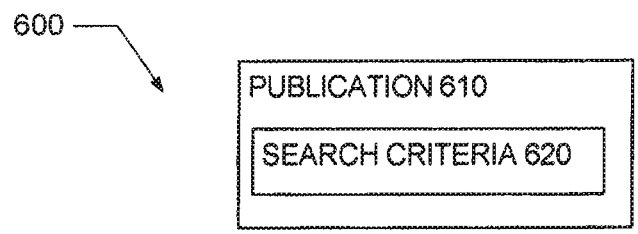
FIG. 8 illustrates an interface according to an example embodiment.

FIG. 8 illustrates an interface 600 of a publication 610, according to an example embodiment. The publication 610 may include a search criteria prompt field 620 to receive search criteria from, for example, a user. The publication 610 may be published through the device and may be published using interfaces such as IVR, SMS, WAP, the world wide web, cable television, J2ME applications, and/or any other types of interfaces.

Figure 9:
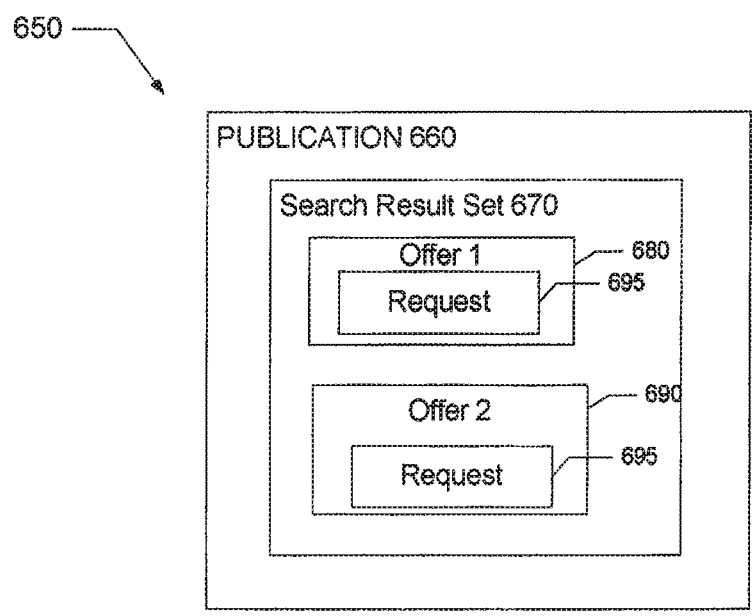
FIG. 9 illustrates an interface according to an example embodiment.

FIG. 9 illustrates an interface 650 of a publication 660, according to an example embodiment. The publication 660 may be published through the device and may be published using, for example, WR, SMS, WAP, and/or J2ME. The publication 660 may include a search result set 670. The search result set 670 constitutes an example of a list of information, which may be published in response to a search query using the received search criteria submitted with respect to FIG. 8.

The search result set 670 may present one or more offers, such as a first offer 680 and a second offer 690. Taking a commerce website as an example, the user may "click through" a hypertext link presented in the list of search results, to be presented with a webpage providing details with regard to the offer, as may have been created in the offer creation application(s) 538. To accept the offer, the client user may select the offer, and may order the offer by submitting the request to the FSP through the device using the request link 695.

In an event where the identifier 166 may be found by the client user in the virtual store of the store application(s), the identifier 166 may be submitted to the FSP through the network-based device, as discussed herein, to order the respective offer. In other embodiments, the identifier 166 is not used in the search results and/or the order transaction.

Flow Chart

Figure 10:
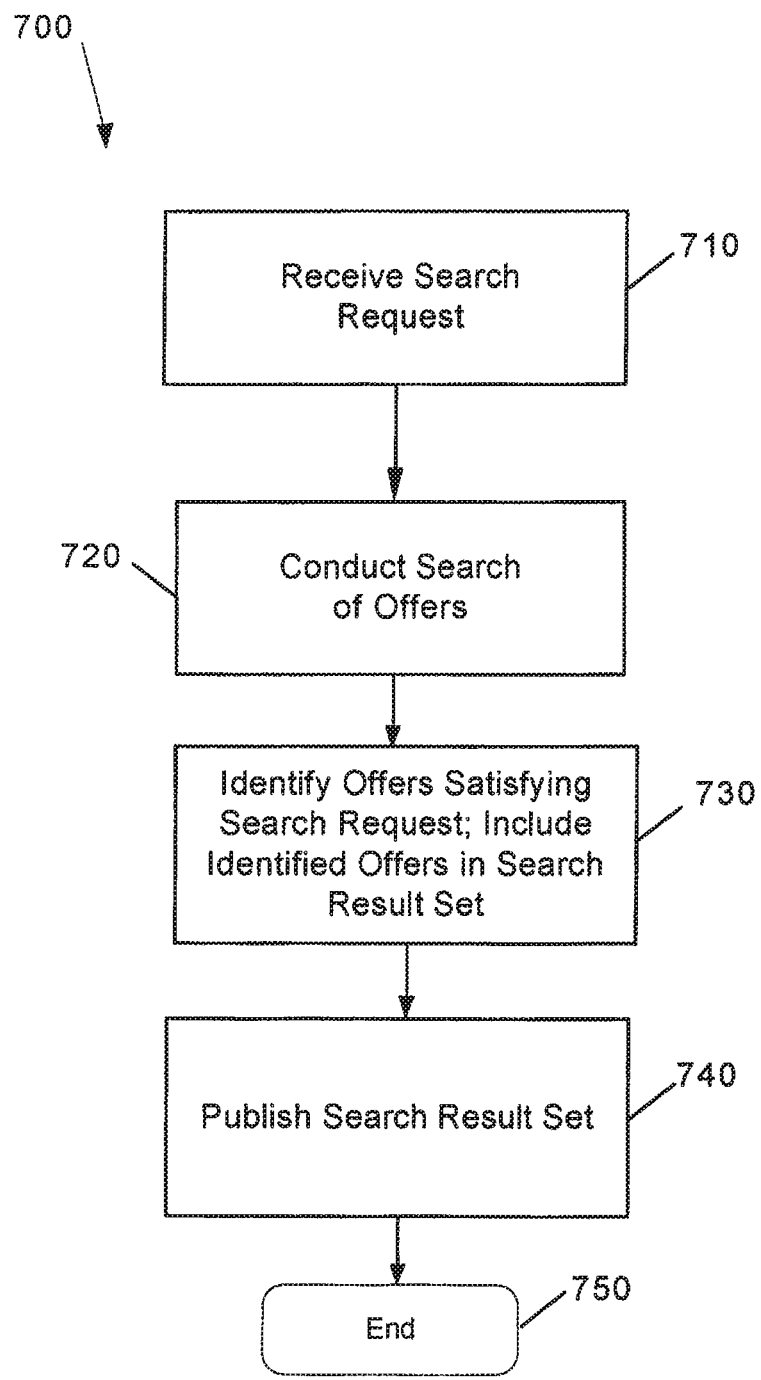
FIG. 10 illustrates a flow chart of a method, according to an example embodiment of the present invention.

FIG. 10 illustrates a flow chart of a method 700, according to an example embodiment of the present invention. The method 700 includes conducting a search for offers according to certain criteria and publishing the search result set.

The method 700 may begin at block 710, where the navigation application(s) may receive a search request after the client user has submitted search criteria in FIG. 8. The search request may include filter criteria such as status criteria, category criteria, price criteria, or any one of a number of other criteria.

At block 720, the navigation application(s) may conduct a search of offers by applying the filter criteria to offers stored in the store application(s), the offers table 94, and/or third party databases, for instance.

At block 730, offers that satisfy the search request are identified, and are included in the search result set 670.

At block 740, the search result set 670 may be published in publication 660. The client user may select and request the offer directly from the search result set, as discussed herein.

The method then ends at block 750.

Computer System

Figure 11:
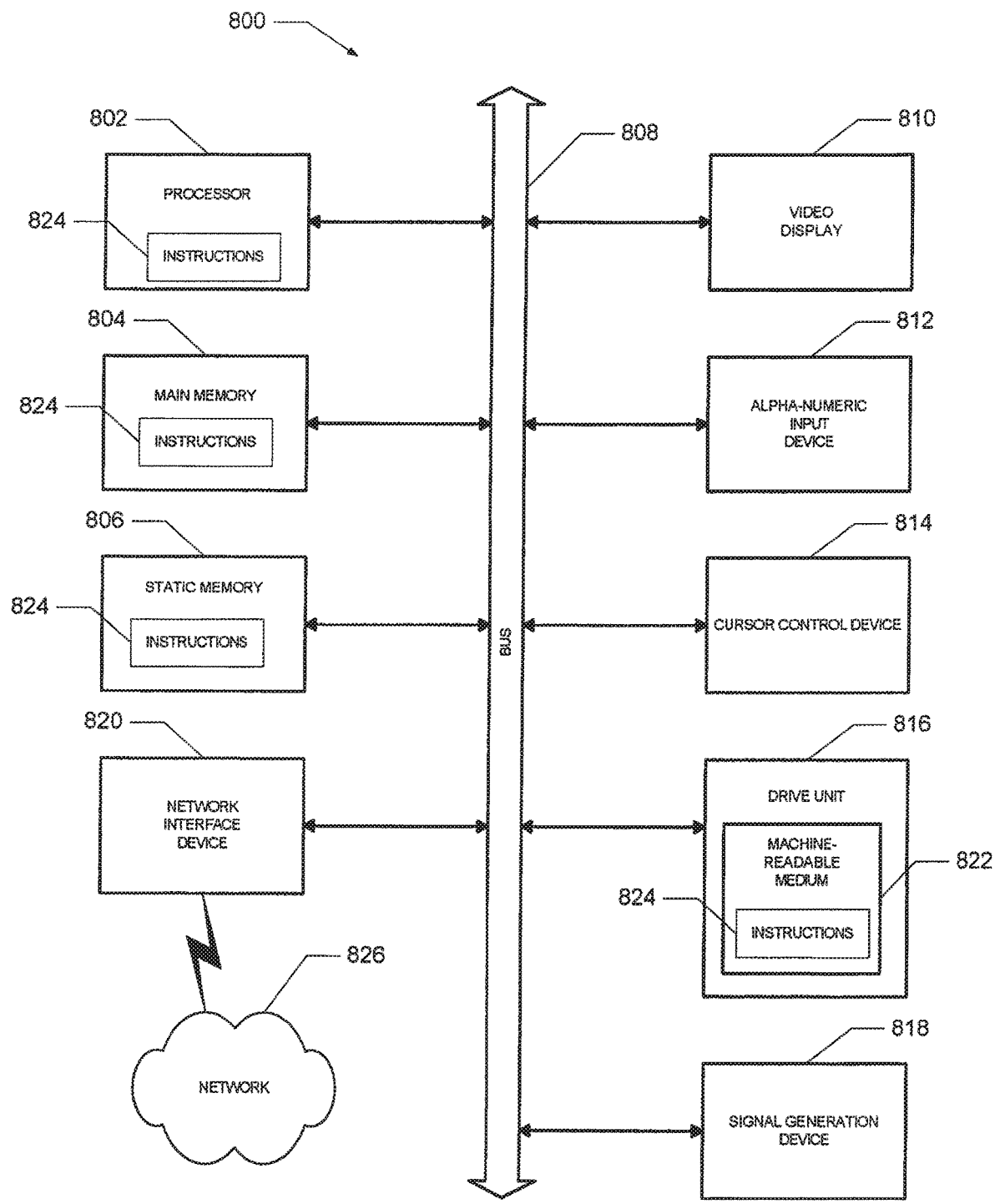
FIG. 11 illustrates a diagrammatic representation of a machine in the form of a computer system within which a set of instructions, for causing the machine to perform any one or more of the methodologies discussed herein, may be executed, according to an example embodiment.

FIG. 11 shows a diagrammatic representation of a machine in the example form of a computer system 800 within which a set of instructions, for causing the machine to perform any one or more of the methodologies discussed herein, may be executed. In alternative embodiments, the machine operates as a standalone device or may be connected (e.g., network) to other machines. In a network deployment, the machine may operate in the capacity of a server or a client user machine in server-client user network environment, or as a peer machine in a peer-to-peer (or distributed) network environment. The machine may be a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a television, television cable a pager, a personal trusted device, a web appliance, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The instructions 824 may also reside, completely or at least partially, within the main memory 804, the static memory 806, and/or within the processor 802 during execution thereof by the computer system 800. The main memory 804 and the processor 802 also may constitute machine-readable media.

The instructions 824 may further be transmitted or received over a network 826 via the network interface device 820.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 11 are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. § 1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, embodiments describe a method and a system to automatically transfer payment to a third party, for example, as part of a request from a network-based device. Although embodiments of the present invention have been described with reference to specific example embodiments, it will be evident that various modifications and changes may be made to these embodiments without departing from the broader spirit and scope of embodiments as expressed in the subjoined claims.

What is claimed is:

1. A system, comprising:
   at least one processor;
   a non-transitory, computer-readable medium having instructions stored thereon that are executable by the at least one processor to cause the system to perform operations comprising:
   receiving, from a network-based device that is associated with a user, a request corresponding to a transaction, wherein the request includes an identifier derived from a publication associated with a third party, wherein the identifier includes: a first portion identifying the third party, and a second portion, different than the first portion, identifying an offer provided by the third party;
   in response to receiving the identifier from the network-based device, automatically processing payment from the user to the third party without any further action by the user, including by:
      using the first portion of the identifier in the request, identifying the third party associated with the transaction;
      using the second portion of the identifier in the request, identifying the offer provided by the third party, including accessing an offer database associated with the identified third party to verify whether the identified offer is valid;
      determining, based on the request, that the user has provided authorization to process payment to the third party based on the offer; and
      automatically transferring a payment amount from an account of the user to an account associated with the third party; and
   providing, to a computer system associated with the third party, a notification of the payment from the user, wherein the notification includes the identifier derived from the publication associated with the third party.

2. The system of claim 1, wherein the operations further comprise:
   receiving a second identifier that is associated with the network-based device; and
   authenticating the user utilizing the second identifier before the payment amount is transferred.

3. The system of claim 1, further comprising:
   a database with payment information associated with the user and with an address destination associated with the user, wherein the database is accessible by the system.

4. The system of claim 1, wherein the operations further comprise:
   providing, to the network-based device, a search interface to accept search criteria from the user and to generate a published listing, wherein the published listing includes at least one offer from the third party.

5. A method, comprising:
   receiving, at a server from a network-based device that is associated with a user, a request corresponding to a transaction, wherein the request includes an identifier derived from a publication associated with a third party, wherein the identifier includes: a first portion identifying the third party, and a second portion identifying an offer provided by the third party;
   in response to receiving the identifier from the network-based device, automatically processing, by the server, payment from the user to the third party without any further action by the user, including by:
      using the first portion of the identifier in the request, identifying the third party associated with the transaction;
      using the second portion of the identifier in the request, identifying the offer provided by the third party, including accessing an offer database associated with the identified third party to verify whether the identified offer is valid;
      determining, based on the request, that the user has provided authorization to process payment to the third party based on the offer; and
      automatically transferring a payment amount from an account of the user to an account associated with the third party; and
   providing, by the server to a computer system associated with the third party, a notification of the payment from the user, wherein the notification includes the identifier derived from the publication associated with the third party.

6. The method of claim 5, wherein the automatically transferring includes performing a transfer of the payment amount without providing user financial information to the third party.

7. The method of claim 5, wherein the automatically transferring includes debiting the account associated with the user at a financial service provider and crediting the account associated with the third party.

8. The method of claim 5, further comprising:
obtaining a user identifier from the network-based device associated with the user; and
automatically determining user identification at a financial service provider to authenticate the user based on the user identifier obtained from the network-based device.

9. The method of claim 5, further comprising:
publishing, by the server, a listing containing the offer and the second portion of the identifier that identifies the offer.

10. The method of claim 5, further comprising:
automatically determining user identification at a financial service provider to authenticate the user upon receipt of a user identifier associated with the network-based device.

11. The method of claim 5, wherein the request is received, at the server from the network-based device, using a short messaging service.

12. A non-transitory, machine-readable medium having instructions stored thereon that, in response to being executed by one or more processors, cause a system to perform operations comprising:
receiving, from a network-based device that is associated with a user, a request corresponding to a transaction, wherein the request includes an identifier derived from a publication associated with a third party, wherein the identifier includes: a first portion identifying the third party, and a second portion identifying an offer provided by the third party;
in response to receiving the identifier from the network-based device, automatically processing payment from the user to the third party without any further action by the user, including by:
using the first portion of the identifier in the request, identifying the third party associated with the transaction;
using the second portion of the identifier in the request, identifying the offer provided by the third party, including accessing an offer database associated with the identified third party to verify whether the identified offer is valid;
determining, based on the request, that the user has provided authorization to process payment to the third party based on the offer; and
automatically transferring a payment amount from an account of the user to an account associated with the third party; and
providing, to a computer system associated with the third party, a notification of the payment from the user, wherein the notification includes the identifier derived from the publication associated with the third party.

13. The non-transitory, machine-readable medium of claim 12, wherein the automatically transferring the payment amount includes performing a transfer of the payment amount without providing user financial information to the third party.

14. The non-transitory, machine-readable medium of claim 12, wherein the operations further comprise:
obtaining a user identifier from the network-based device associated with the user; and
automatically determining user identification at a financial service provider to authenticate the user based on the user identifier obtained from the network-based device.

15. The method of claim 5, wherein the publication associated with the third party is included in a webpage.

16. The method of claim 15, wherein the identifier is an alphanumeric code depicted within the publication.

17. The method of claim 5, wherein the publication associated with the third party includes a code provided in a machine-readable form.

18. The method of claim 17, wherein the code is provided as a barcode.

19. The method of claim 5, wherein the identifier is transmitted from the publication to the network-based device using Near-Field Communication (NFC).

20. The method of claim 5, wherein the automatically processing the payment from the user to the third party further includes verifying that the offer provided by the third party is available at a time that the request is received.

* * * * *